United States Patent
Fukumoto et al.

(10) Patent No.: US 9,024,888 B2
(45) Date of Patent: May 5, 2015

(54) OPERATION CONSOLE ENABLING APPROPRIATE SELECTION OF OPERATIONAL MODE BY THE USER, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

(75) Inventors: Tetsuo Fukumoto, Osaka (JP); Naohiro Ando, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1036 days.

(21) Appl. No.: 13/050,015

(22) Filed: Mar. 17, 2011

(65) Prior Publication Data

US 2011/0242024 A1 Oct. 6, 2011

(30) Foreign Application Priority Data

Mar. 30, 2010 (JP) ................ 2010-077030

(51) Int. Cl.
*G06F 3/041* (2006.01)
*H04N 1/00* (2006.01)

(52) U.S. Cl.
CPC ....... *H04N 1/00416* (2013.01); *H04N 1/00411* (2013.01); *H04N 1/00421* (2013.01); *H04N 1/00424* (2013.01); *H04N 1/0044* (2013.01); *H04N 1/00472* (2013.01); *H04N 1/00474* (2013.01); *H04N 1/00477* (2013.01); *H04N 1/00482* (2013.01); *H04N 2201/0094* (2013.01)

(58) Field of Classification Search
CPC .......... H04N 1/00411; H04N 1/00416; H04N 1/00421; H04N 1/00424; H04N 1/00472; H04N 1/00474; H04N 1/00477; H04N 1/00482; H04N 1/0044; H04N 2201/0094

USPC .................... 178/18.01–19.07; 345/173–178; 715/700–866

See application file for complete search history.

(56) References Cited

U.S. PATENT DOCUMENTS

| | | | |
|---|---|---|---|
| 6,377,286 B1 * | 4/2002 | Hochmuth | 715/810 |
| 6,421,509 B1 | 7/2002 | Nomura et al. | |
| 7,633,636 B2 | 12/2009 | Nagumo | |
| 2007/0033540 A1 * | 2/2007 | Bridges et al. | 715/769 |
| 2007/0247641 A1 | 10/2007 | Okuda et al. | |
| 2011/0199637 A1 | 8/2011 | Yoshida et al. | |

FOREIGN PATENT DOCUMENTS

| | | |
|---|---|---|
| CN | 102164221 A | 8/2011 |
| JP | 2001-154773 A | 6/2001 |
| JP | 2002-281200 A | 9/2002 |
| JP | 2007-293416 A | 11/2007 |
| JP | 2006-308831 A | 11/2009 |

* cited by examiner

*Primary Examiner* — Michael Pervan
(74) *Attorney, Agent, or Firm* — Renner, Otto, Boisselle & Sklar, LLP

(57) ABSTRACT

In order to enable appropriate selection of one operational mode from a plurality of operational modes by the user, on a home screen image allowing selection of an operational mode of an image forming apparatus, displayed are: an icon for selecting a copy mode related to image formation at the center; an icon for selecting a FAX mode with priority as a frequently selected mode related to image transmission; and icons allowing direct selection of other operational modes related to image transmission. On a condition setting screen image of a mode related to image transmission, a software button or buttons allowing transition to another mode related to image transmission are displayed.

16 Claims, 16 Drawing Sheets

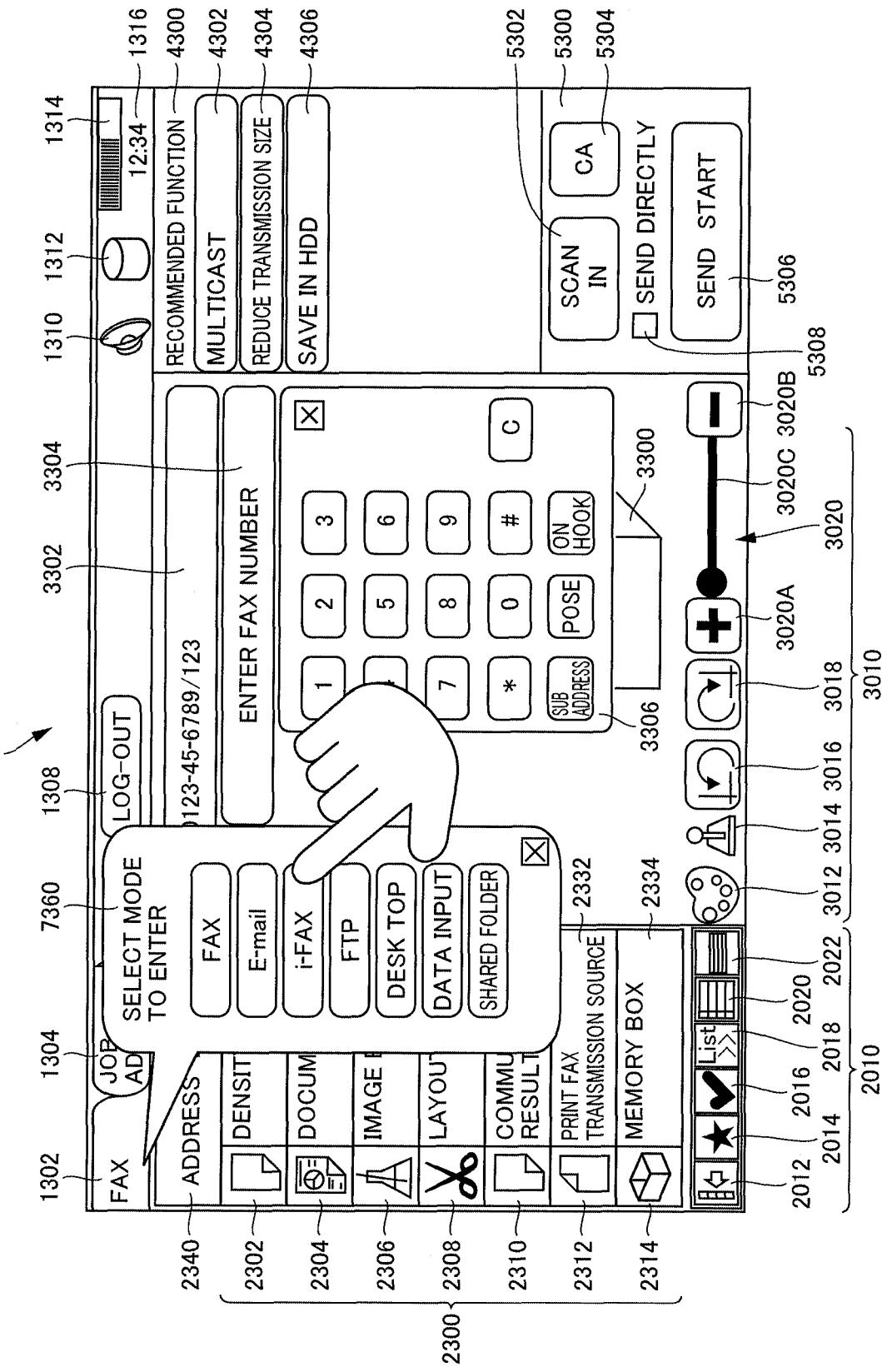

OPERATION CONSOLE ENABLING APPROPRIATE SELECTION OF OPERATIONAL MODE BY THE USER, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

CROSS-REFERENCE TO RELATED APPLICATION

This nonprovisional application claims priority under 35 U.S.C. §119(a) on Patent Application No. 2010-077030 filed in Japan on Mar. 30, 2010, the entire contents of which are hereby incorporated by reference.

BACKGROUND OF THE INVENTION

1. Field of the Invention

The present invention relates to an operation console displaying information to the user and operated by the user based on the information. More specifically, the present invention relates to an operation console that prevents confusion of the user even if configuration of the operation console for selecting an operational mode is changed in an electronic device having a plurality of operational modes. The present invention also relates to an electronic device and an image processing apparatus provided with such an operation console, as well as to a method of displaying information on the operation console.

2. Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operational modes such as a copy mode, a facsimile mode (hereinafter "facsimile" may also be denoted as FAX or fax), a network-supported printer mode and a scanner mode. In such an image forming apparatus, each user selects an operational mode and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operational mode is displayed, so that the user can easily set various functions. Further, while a job is being executed, job progress status may be displayed, to allow the user to easily grasp the progress status of the job. In the printer mode executed upon reception of data from an external device, the job progress status may be displayed in accordance with the data received from the external device as a source.

Recently, a touch-panel display having a touch-panel formed on a liquid crystal panel (display panel) comes to be increasingly used as such an operation panel. By way of example, items (software buttons) allowing selection of an operational mode of the image forming apparatus are displayed on the touch-panel display, the user viewing the display presses a position of an item displayed on the touch-panel display (presses a software button), and the operational mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that, strictly speaking, (different from other gesture operations) tapping and double-tapping are not determined by detecting the user operation trajectory on the touch-panel display (not the trajectory but a position is detected). Considering the relation to other gesture operations, in the present specification, the gesture operation generally refers to an operation for detecting a user request based on the operation trajectory of the user to the touch-panel display, including tapping and double tapping.

In the present invention, an operation other than the gesture operations as such will be described as a touch operation. The touch operation means an operation of detecting a user's request based on the position of operation by the user on the touch-panel display. A representative example of the touch operation is an operation of the user pressing a position of an item (pressing a software button) displayed on the touch-panel display.

In an MFP provided with a touch-panel display allowing both touch operation and gesture operation, many pieces of information intended for the user are displayed on the touch-panel display. Such an MFP has a plurality of basic operational modes as described above, and it is necessary for the user to select one operational mode from the plurality of operational modes. Such a user selection is input by touching a software button displayed on the touch-panel display.

By way of example, Japanese Patent Laying-Open No. 2006-308831 (hereinafter referred to as '831 Reference) discloses an image forming apparatus including a plurality of processing functions (copy function, facsimile function, scanner function, electronic mail function, etc.), that improves user operability by controlling screen image transitions.

The image forming apparatus includes: a display unit, displaying a menu screen image allowing selection of any of the plurality of processing functions, or a function instruction screen image allowing execution of a processing function; an operation unit, receiving a user operation related to the selected processing function, based on the screen image displayed on the display unit; a detection unit detecting absence of any operation, related to the selected processing function, on the operation unit for a prescribed time period; and a control unit, returning, if it is detected by the detecting unit that no operation is done for the prescribed time period, the screen image on the display unit to an initial display of the function instruction screen image related to the selected processing function.

The image forming apparatus is controlled such that, if no operation is done by the operation unit for a prescribed time period, the detecting unit detects the absence of operation, the function instruction screen image related to the processing function displayed on the display unit is reset, and the display is returned to the initial screen image of the function instruction screen image. Therefore, as an automatic reset process that takes place after the lapse of the prescribed time period, the initial screen image corresponding to the function that has been selected immediately before is resumed. Therefore, when the user is to proceed to the next process, the process function can readily be executed. The menu screen image shown in FIG. 3(a) of '831 Reference is displayed on the touch-panel display. On the menu screen image, software buttons for switching among copy function, facsimile function, scanner function (mail transmission) and scanner function (box storage) are displayed. In the image forming apparatus, if a user wishes to have image data obtained by scanning a document sent by facsimile, he/she touches "FAX" button, if the user wishes to have the image data transmitted by mail, he/she touches "SCANNER (MAIL TRANSMISSION)" button, and if the user wishes to have the image data transmitted to a prescribed storage device, he/she touches "SCANNER FUNCTION (BOX STORAGE)" button. In this manner, an operational mode can directly be selected from the menu screen image displayed on the image forming apparatus. It is expected that in future image forming apparatuses, direct selection of operational modes by touching software buttons displayed on the menu screen image will be more popular.

On the other hand, some image forming apparatuses are provided with hardware buttons for selecting operational modes, rather than the software buttons displayed on the touch-panel display for selecting operational modes. By way of example, Japanese Patent Laying-Open No. 2001-154773 (hereinafter referred to as '773 Reference) discloses an image forming apparatus provided with hardware buttons such as function selection keys for selecting copy function, printer function and facsimile function, and a job status key instructing selective display of current status of image forming job.

As can be seen from FIG. 4 of '773 Reference, an operation panel of the image forming apparatus includes hardware buttons of "PRINT," "FAX," "COPY" and "JOB STATUS." In the image forming apparatus disclosed in '773 Reference, if a user wishes to have the image data obtained by scanning a document sent by facsimile, he/she presses the "FAX" button. If the user wishes to have the image data sent by mail, he/she presses the "FAX" button, thereafter, presses an "EMAIL ADDRESS" button on a screen image shown in FIG. 18 of this reference, and inputs an address. In this manner, the hardware button of "FAX" provided on the image forming apparatus is pressed first, and then, a further function is selected by touching a software button (here, "EMAIL ADDRESS" button) displayed on the touch-panel display as needed, to attain FAX transmission or mail transmission. Different from the image forming apparatus disclosed in '831 Reference, functions related to transmission are collectively represented by the "FAX" button (or FAX is given priority among the functions related to transmission), and selection of an operational mode related to transmission is made through the "FAX" button. One reason to take such an approach is that the size of operation panel is limited and large number of hardware buttons cannot be arranged. In many conventional image forming apparatuses, it is often the case that a hardware button configured with such a limitation is pressed to select one operational mode (an operational mode of high priority, or an inclusive operational mode) and thereafter, a further operational mode is selected. Such a method of operation is for selecting one operational mode indirectly from a plurality of operational modes.

It is expected that the conventional image forming apparatus in which an operational mode is selected by pressing a hardware button arranged on the operation panel will be replaced by a new image forming apparatus in which an operational mode is directly selected by touching a software button displayed on a menu screen image. Such a replacement may possibly cause a problem that the user is confused on the difference of operation method and fails to appropriately select an operational mode.

References mentioned above are silent about any solution to such a problem.

Specifically, in the conventional image forming apparatus, a hardware button for selecting "FAX" that is highly frequently selected among the functions related to transmission is provided, and by pressing the "FAX" button, "FAX" mode is selected once and thereafter the mail mode is selected (assuming that higher priority is given to FAX than mail). In contrast, in the new image forming apparatus in which a large number of software buttons can be provided relatively easily, both "FAX" button and "MAIL" button are provided to enable direct selection of a function. The user may be confused on such difference in the operation method.

In the image forming apparatus (new image forming apparatus) disclosed in '831 Reference, software buttons for selecting an operational mode are displayed on the touch-panel display. The output of image forming apparatus in the copy mode is a print output to a sheet of recording paper, while the output in a mode related to transmission is transmission output of data, the output results differ. Simply placing side by side the software buttons for selecting operational modes having different output results on the touch-panel display makes it difficult for the user to appropriately select an operational mode.

If an image forming apparatus has a plurality of transmission paths, there are many types of operational modes related to transmission, leading to a large number of software buttons displayed on the touch-panel display for selecting an operational mode. Simply placing side by side the large number of software buttons for selecting operational modes related to transmission on the touch-panel display makes it difficult for the user to appropriately select an operational mode.

SUMMARY OF THE INVENTION

An object of the present invention is to provide, in an electronic device and an image processing apparatus (an image forming apparatus) having a plurality of operational modes, a technique allowing the user to appropriately select an operational mode even when a user interface for selecting an operational mode is changed to software buttons displayed on the touch-panel display.

According to an aspect, the present invention provides an operation console provided on an apparatus as an object of control operating in a mode selected by a user from a plurality of modes. The operation console includes: a display device displaying a plurality of information items corresponding to the plurality of modes, aligned considering either priority of the modes or difference in output from the apparatus as the object of control; a detector arranged superposed on the display device, for detecting a mode selected by the user based on an information item displayed at a position touched by a fingertip of the user; and a display controller controlling the display device.

According to another aspect, the present invention provides a method of displaying information on an operation console provided on an apparatus as an object of control operating in a mode selected by a user from a plurality of modes, including: the display step of displaying, on a display panel, a plurality of information items corresponding to the plurality of modes, aligned considering either priority of the modes or difference in output from the apparatus as the object of control; and the detecting step of detecting, using a touch-panel arranged superposed on the display panel, a mode selected by the user based on an information item displayed at a position touched by a fingertip of the user.

In the operation console and the method of displaying information on the operation console, when a mode of the apparatus as the object of control is to be selected, the user touches with his/her fingertip one of a plurality of information items (software buttons, icons and the like) corresponding to the plurality of modes. Here, the information items are arranged aligned in consideration of mode priority or difference in output from the apparatus as the object of control. For instance, the arrangement is such that an information item corresponding to a specific mode that is selected with high frequency among the plurality of modes (mode of high priority) is made highly noticeable. Therefore, it is possible for the user to easily find the mode used frequency. If a mode that has been allocated to a hardware button of a conventional operation console (or the apparatus as the object of control) is set as the mode of priority, it is possible for a user who is accustomed to use the conventional hardware button to easily find the same mode. Assume, for example, that the apparatus as the object of control is an image processing apparatus (image forming apparatus). Then, the items are arranged such that the information item corresponding to a mode providing print output on a sheet of recording paper is clearly distinguishable from the information item corresponding to a mode providing transmission output of data. Since the information items corresponding to modes are aligned based on the difference in output from the apparatus as the object of control, it is possible for the user to easily find the information item to be selected. As a result, even when the user interface allowing selection of an operational mode is changed to the software buttons displayed on the touch-panel display, it is possible for the user to appropriately select an operational mode.

The modes in the apparatus as the object of control may include two or more communication modes. Then, the display controller may include a circuit displaying an information item allowing selection of one of the communication modes given priority among the two or more communication modes, and a plurality of information items allowing selection of any of the two or more communication modes.

In this configuration, if the communication mode that has been allocated to a hardware button of a conventional image forming apparatus is set as the communication mode with priority, the information item corresponding to the communication mode with priority is arranged to be more noticeable. Therefore, it is possible for a user who is accustomed to use the conventional hardware button to easily find the same communication mode.

The display controller may further include a circuit for switching a screen image when a communication mode with priority is selected, to display a condition setting screen image in the selected communication mode, and a circuit for displaying an information item allowing transition to another communication mode on the condition setting screen image.

In this configuration, when a large number of software buttons are necessary for selecting communication modes, it is easier for the user to at first select a mode with priority, since the information item corresponding to the mode with priority is arranged to be more noticeable. On the condition setting screen image displayed after the selection of mode with priority, information items allowing transition to other communication modes are displayed and, therefore, easy transition to another communication mode is possible. Such a method of operation is similar to the conventional operation method in which the FAX mode is once selected by pressing the "FAX" button and then the mail mode is selected. Therefore, confusion by a user who is accustomed to use the conventional image forming apparatus can be prevented.

The modes in the apparatus as the object of control may include a non-communication mode and two or more communication modes. Then, the display controller may include a circuit for displaying a first information item allowing selection of the non-communication mode and a plurality of second information items allowing selection of a communication mode, and a circuit for displaying the second information items aligned around the first information item.

Assume, for example, that the apparatus as the object of control is an image processing apparatus. Then, the items are arranged such that the information item corresponding to the non-communication mode providing print output on a sheet of recording paper is clearly distinguishable from the information item corresponding to the communication mode of providing transmission output of data. Since the information items corresponding to modes are aligned based on the difference in output from the apparatus as the object of control (the item for the non-communication mode placed at the center and items for the modes related to communication are placed therearound), it is possible for the user to easily find the information item to be selected.

The display controller may include a circuit for displaying a third information item allowing selection of one communication mode with priority among the two or more communication modes, and a plurality of fourth information items allowing selection of any of the two or more communication modes, as the second information items.

In this configuration, since the third information item corresponding to the communication mode with priority is displayed, it is possible to easily select the communication mode that is selected with high frequency by selecting the third information item.

The display controller may include a circuit displaying the third information item at a position closer to the user than the fourth information item. The display controller may include a circuit for displaying the third and fourth information items such that the fourth information item is not hidden by the user's hand touching the third information item.

When a large number of information items corresponding to a large number of communication modes are displayed, the third information item corresponding to the communication mode with priority is displayed close to the user. By way of example, an information item corresponding to the communication mode that has been allocated to the hardware button in the conventional image processing apparatus (communication mode with priority) is arranged on the side closer to the user. Therefore, it can easily be found by the user. Further, if the user touches with his/her hand the third information item corresponding to the communication mode with priority, the fourth information item corresponding to a mode other than the communication mode with priority is not hidden by the user's hand. Specifically, when the user operates the third information item, the fourth information item is not hidden by the user's own hand but is visible. Therefore, the user can recognize the fourth information item (new option for operation).

The display device and the detector may be implemented by a touch-panel display.

Even when the user interface for selecting an operational mode is changed to software buttons using the touch-panel display formed by superposing the touch-panel as a detector on the display panel as a display device, it is possible for the user to appropriately select an operational mode.

According to another aspect, the present invention provides an electronic device provided with the operation console described above. According to a still further aspect, the present invention provides an image processing apparatus provided with the above-described operation console.

Thus, in the electronic device and image processing apparatus having a plurality of operational modes, even when the user interface for selecting an operational mode is changed to software buttons displayed on the touch-panel display, it is possible for the user to appropriately select an operational mode.

The difference in output from the image processing apparatus as the apparatus as the object of control may be difference between print output on a sheet of recording paper and transmission output of data.

Since the information items are arranged such that the copy mode (non-communication mode) providing print output to a sheet of recording paper is clearly distinguished from the communication mode providing transmission output of data, it is possible for the user to easily find a mode to be selected.

The communication mode in the image processing apparatus in accordance with the present invention may be an image communication mode, and the communication modes may have different communication paths.

In an image processing apparatus having two or more image communication modes using different communication paths such as the public line (FAX line) and the Internet line, even when the user interface for selecting an operational mode is changed to software buttons displayed on the touch-panel display, it is possible for the user to appropriately select an operational mode.

The communication mode in the image processing apparatus in accordance with the present invention may be an image communication mode, and a communication mode with priority among two or more communication modes may be a mode set by the user.

By setting the mode that is selected frequently as the communication mode with priority, the mode used frequently can be selected easily. By setting the mode selected by the hardware button in the conventional image processing apparatus as the communication mode with priority, the mode can be selected easily in the manner similar to the conventional operation method.

The communication mode in the image processing apparatus in accordance with the present invention may be an image communication mode, and the non-communication mode may be an image forming mode.

Since the information items are arranged such that the image communication mode providing transmission output of data is clearly distinguished from the image formation mode providing print output on a sheet of recording paper, it is possible for the user to easily find the mode to be selected.

According to the present invention, in the electronic device and image processing apparatus (image forming apparatus) including a plurality of operational modes, even when the user interface for selecting an operational mode is changed to software buttons displayed on the touch-panel display, it is possible for the user to appropriately select an operational mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 shows the touch-panel display screen image after the operational mode display area is touched as shown in FIG. 15.

DESCRIPTION OF THE PREFERRED EMBODIMENTS

Figure 1:
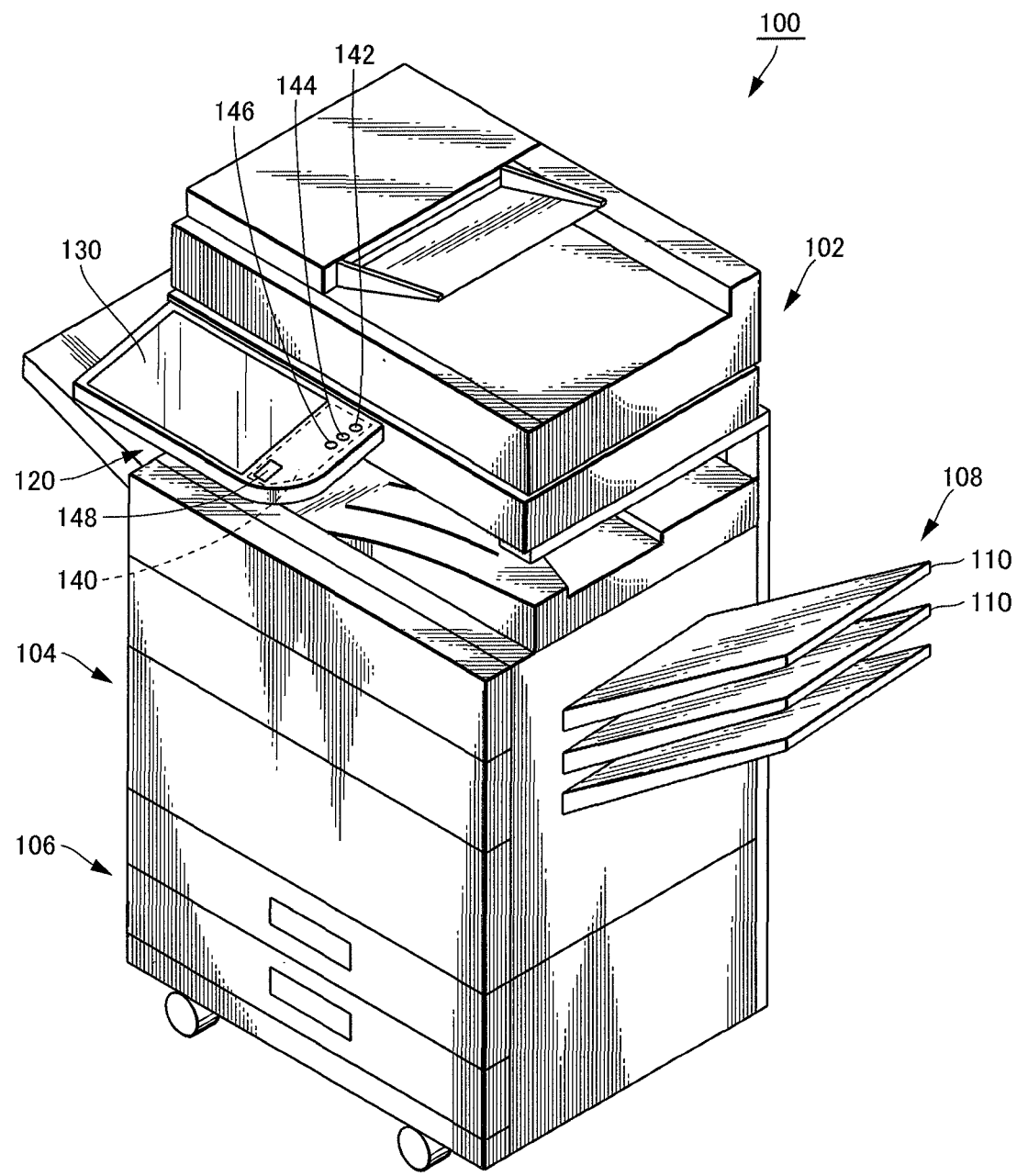
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. The operation console device in accordance with the present invention may be applicable to an image processing apparatus or an electronic device other than the image forming apparatus. The electronic device in accordance with the present embodiment may be any apparatus having a plurality of operational modes and provided with an operation console capable of displaying operational mode selection buttons on the touch-panel display in such a manner that enables the user to appropriately select an operational mode without confusion, even when the buttons for selecting the operational mode are changed from hardware buttons to software buttons.

The image forming apparatus 100 in accordance with the present embodiment includes a touch-panel display allowing operation by the gesture operation method and the touch-operation method not using the gesture operation. The apparatus, however, may include a touch-panel display allowing touch operation only.

The image forming apparatus forms an image on a sheet of recording paper by electro-photography. The image forming apparatus includes, as operational modes, copy mode, mail mode, FAX mode, i-FAX mode, shared folder mode, data input mode, FTP (File Transfer Protocol) mode and desk top mode.

In the mail mode, image data formed by scanning is transmitted by electronic mail (e-mail) to a designated e-mail address. In the i-FAX mode, an image data file is transmitted as an attachment to an e-mail to a designated e-mail address through the Internet. The i-FAX mode may include a function referred to as direct SMTP (Simple Mail Transfer Protocol) allowing direct inter-office communication not through a mail server. In the shared folder mode, an image data file formed by scanning is transmitted with its format unchanged, to a shared folder of a computer of the same network to which the image forming apparatus is connected. The data input mode is also referred to as meta data transmission in which, besides the image data file, meta data (data representing attributes, method of processing and the like of the transmitted data) is generated based on information registered in advance and transmitted. In the FTP mode, an image data file formed by scanning is transmitted to a directory of a designated FTP server using a dedicated protocol. In the desk top mode, an image data file formed by scanning is transmitted to a personal computer on an intra-net.

Of these modes, the FAX mode, i-FAX mode, shared folder mode, data input mode, FTP mode and desk top mode are operational modes related to transmission. These operational modes related to transmission will be generally referred to as image transmission mode. It is noted that the present invention is not limited to an image forming apparatus having the image transmission modes of these names.

The image forming apparatus may further include a network printer mode. The present invention is not limited to the above, and it may be any image forming apparatus including at least two image transmission modes (for example, FAX mode and another operational mode related to transmission) in addition to copy mode, and having operational mode selecting buttons displayed on the touch-panel display to allow the user to appropriately select an operational mode without confusion. Further, the printing method is not limited to electro-photography.

[Image Forming Apparatus: Function]

Figure 2:
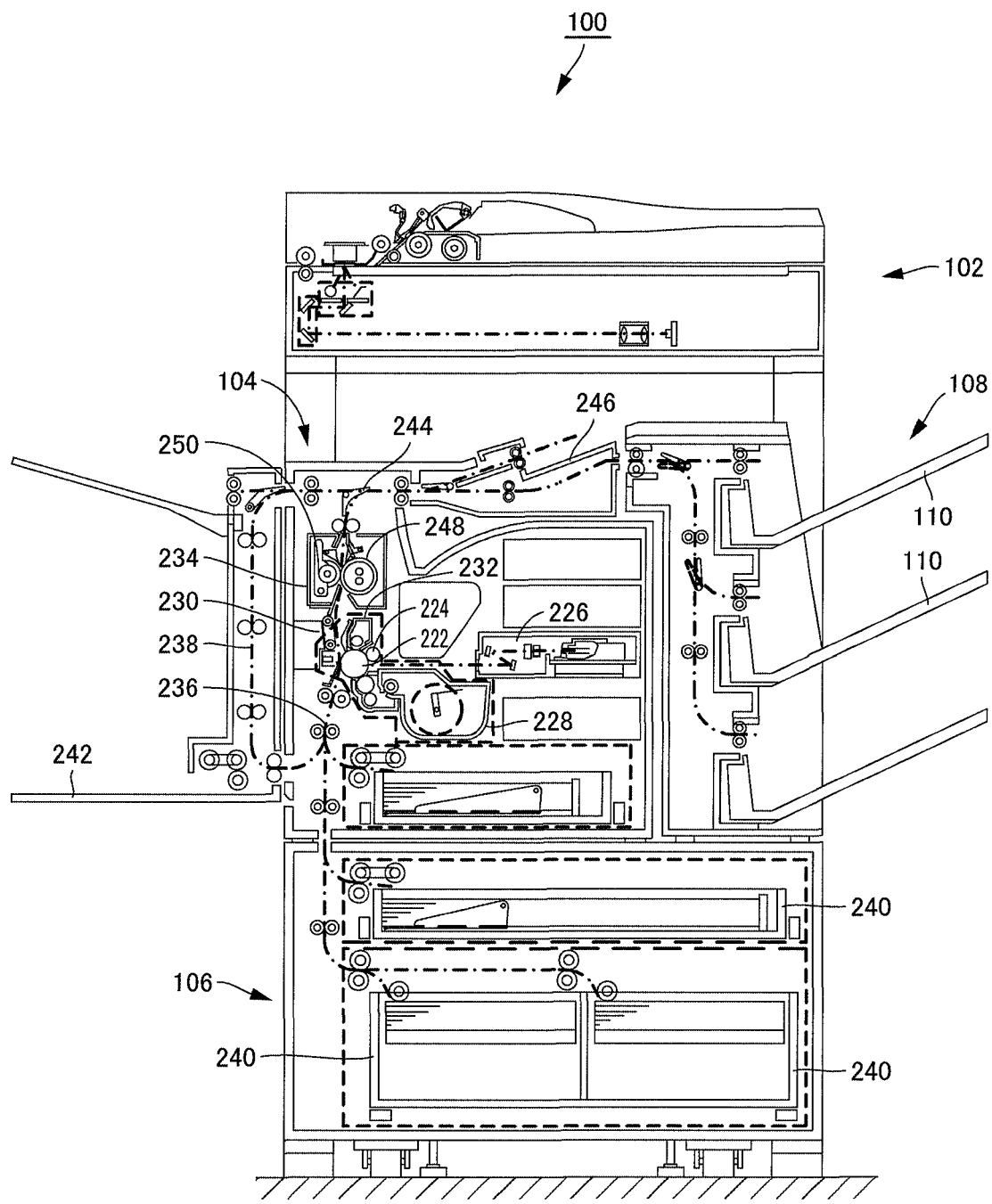
FIG. 2 schematically shows an internal configuration of the image forming apparatus shown in FIG. 1.
Figure 3:
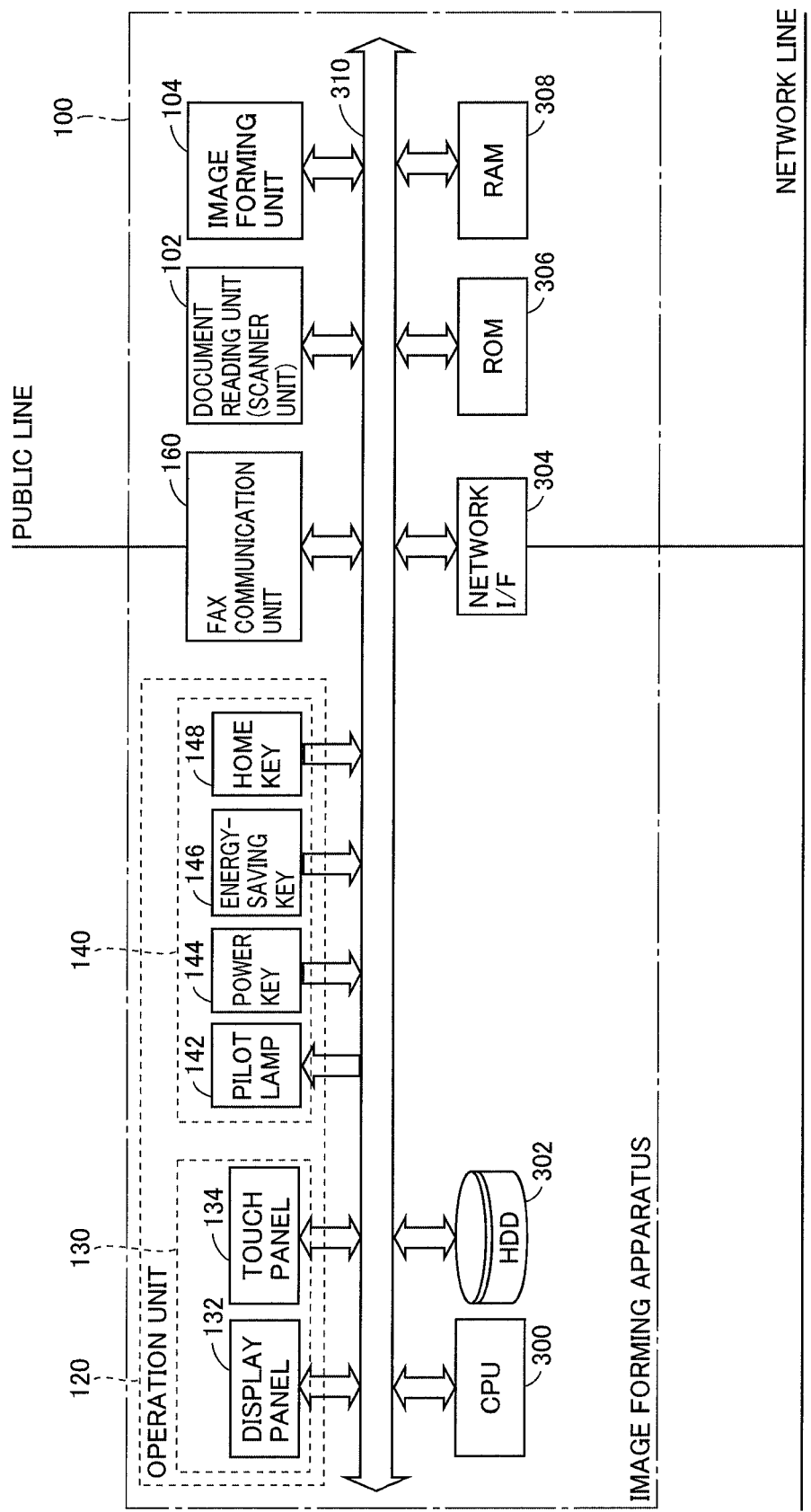
FIG. 3 is a functional block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 and a display operation unit 140. Touch-panel display 130 includes a display panel 132 formed of a liquid crystal panel or the like, and a touch-panel 134 arranged on display panel 132, for detecting a position pressed by the user's finger. Display operation unit 140 includes a pilot lamp 142, a power key 144, an energy-saving key 146, and a home key 148 for returning the display screen image on touch-panel display 130 to a home screen image for selection of an operational mode.

As described above, image forming apparatus 100 in accordance with the present embodiment is provided with touch-panel display 130 as a main operation device, and, in addition, with display operation unit 140 including hardware keys and a pilot lamp. The keys (power key 144, energy-saving key 146 and home key 148) of display operation unit 140 are hardware buttons, in contrast to the software buttons realized by touch-panel display 130. It is noted that image forming apparatus 100 is not limited to one having display operation unit 140 as such, and the apparatus may only include touch-panel display 130. The invention is applicable to any apparatus in which the display is switched to an initial screen image of a selected operational mode, when the user selects the operational mode on the home screen image displayed on touch-panel display 130. The operational modes of image forming apparatus 100 as such will be described.

—Copy Mode—

In the following, an operation in the copy mode will be described. In the copy mode, mainly document reading unit (also referred to as a scanner unit) 102 and image forming unit 104 operate.

In image forming apparatus 100, a document placed on a platen is read by document reading unit 102 as image data. The read image data is input to CPU (Central Processing Unit) 300 implemented, for example, by a microcomputer shown in FIG. 3. The image data is subjected to various image processing operations here, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

—Facsimile Mode—

In the following, an operation in the facsimile mode will be described. In the facsimile mode, document reading unit (scanner unit) 102 and FAX communication unit 160 mainly operate for the transmission operation, and FAX communication unit 160 and image forming unit 104 mainly operate for the reception operation.

Transmission Operation

In image forming apparatus 100, the facsimile mode is designated. A document placed on the platen is read by document reading unit 102 as image data. The read image data is input to CPU 300 implemented, for example, by a microcomputer shown in FIG. 3, the image data is subjected to various image processing operations here, and the resulting image data is output to a FAX communication unit (FAX communication unit 160 of FIG. 3)

FAX communication unit 160 of image forming apparatus 100 on the transmitting side connects a designated transmitting side line to a designated transmission destination. FAX communication unit 160 converts the image data to communication data in compliance with facsimile transmission standard, and transmits the converted data to a facsimile machine (such as an image forming apparatus 100 having the facsimile mode) on the receiving side.

Communication Operation

When the line is connected, a FAX communication unit 160 of image forming apparatus 100 on the receiving side detects a communication request signal from FAX communication unit 160 of image forming apparatus 100 on the transmitting side, and transmits an acknowledgement signal. Thereafter, by way of example, FAX communication units 160 on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to the FAX communication unit 160 of image forming apparatus 100 on the receiving side. When transmission ends, the line is disconnected.

Reception Operation

FAX communication unit 160 of image forming apparatus 100 on the receiving side converts the received data to image data and passes the data to an image forming unit 104. The received data may be converted to image data at the image forming unit 104. The image forming unit 104 prints an image of a document represented by the image data converted from the received data on a sheet of recording paper, in a manner similar to the operation in the copy mode described above.

—Other Image Transmission Mode—

In the following, operations in the mail mode, i-FAX mode, shared folder mode, data input mode, FTP mode and desk top mode as the image transmission modes other than the facsimile mode will be described. As regards the image transmission modes, outline of the i-FAX mode will be described. In these image transmission modes, document reading unit (scanner unit) 102 and image forming unit 104, as well as network interface 304 mainly operate.

In image forming apparatus 100, a document placed on the platen is read by document reading unit 102 as image data.

The read image data is input to CPU 300 and subjected to various image processing operations here. The resulting image data is stored in a storage device (hard disk drive 302 as will be described later) provided in image forming apparatus 100. The image data is converted to a format (for example, TIFF (Tagged Image File Format)-F format) usable in i-FAX, and the converted data file is attached to an e-mail. The e-mail as such is transmitted to another image forming apparatus or to a computer through network interface 304 and the Internet.

An image forming apparatus that is to receive the i-FAX connects to a mail server at a predetermined time interval, and receives mails addressed to it, stored in the mail server.

Different from the facsimile mode in which a telephone number of transmission destination is designated, a mail address, an IP address, a server computer name, a computer name, a folder name or the like of the transmission destination is designated, in these image transmission modes.

[Image Forming Apparatus: Control Block Configuration]

Referring to FIG. 3, image forming apparatus 100 further includes operation unit 120, which allows setting of functions related to the copy mode, facsimile mode, document filing mode and mail mode; ROM (Read Only Memory) 306, which stores programs and the like; a hard disk drive (hereinafter denoted as HDD) 302, which is a non-volatile storage area capable of storing programs and data even when power is cut off; and an RAM (Random Access Memory) 308, which provides a storage area when a program is executed.

Image forming apparatus 100 further includes: a bus 310 connected to document reading unit 102, image forming unit 104, FAX communication unit 160, operation unit 120, ROM 306, HDD 302, and RAM 308; and CPU 300 connected to bus 310, for realizing general functions as the image forming apparatus.

HDD 302 stores files of image data of documents scanned by image forming apparatus 100, folder by folder, together with date and time of saving and name of the user who saved. Further, HDD 302 stores initial screen image data of each operational mode.

ROM 306 stores programs and data necessary for controlling operations of image forming apparatus 100. The initial screen image data of each operational mode may be stored as data to be stored together with the program in ROM 306. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160 of image forming apparatus 100. To network interface 304, a network line is connected. To the network line, a computer or the like using image forming apparatus 100 as a network-supported printer may be connected. To the network line, a computer or the like identified by a URL (Uniform Resource Locator) designated through the Internet may be connected, or a computer or an image forming apparatus to which image data is transmitted in the image transmission mode may be connected. When connected to the Internet, image forming apparatus 100 can obtain necessary information or transmit/receive image data, through the Internet.

RAM 308 provides a function of a working memory for temporarily storing results of operations and processes by CPU 300, and a function of a frame memory for storing image data.

CPU 300 controls document reading unit 102, image forming unit 104, ROM 306, HDD 302, RAM 308 and touch-panel display 130 and display operation unit 140 forming operation unit 120, by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, touch-panel display 130 is provided on the left side area, and display operation unit 140 (pilot lamp 142, and power key 144, energy-saving key 146 and home key 148 as hardware buttons) is provided on the right side area. Touch-panel display 130 and display operation unit 140 form operation unit 120 as one integrated body as a whole.

As described above, touch-panel display 130 is formed of display panel 132 and touch-panel 134 arranged on display panel 132. On display panel 132 of touch-panel display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed, the pressed position is detected by the touch-panel 134. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of touch-panel display 130 to the initial state (home screen image). The processes performed when power key 144, energy-saving key 146 and home key 148 are pressed are not limited to the above.

In a hardware button (power key 144, energy-saving key 146 and home key 148) of display operation unit 140, a key lamp or key lamps, which is turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the operational modes as described above. On touch-panel display 130, software buttons for setting functions in respective operational modes are displayed, and buttons for setting a destination or a preview as an expected image, for example, are displayed as needed.

In different operational modes, different screen images are displayed on touch-panel display 130. In order to allow the user to easily find a required piece of information even in such a state, touch-panel display 130 is divided into a plurality of areas (with the size of each area made variable), and pieces of information are displayed in these areas. More specifically, in image forming apparatus 100, if an operational mode is selected on the home screen image of touch-panel display 130 provided as a main display operation device, the initial screen image of each operational mode is displayed. The initial image has the following characteristics. (1) The basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible (since the flow lines of the user's viewpoint and fingertip are similar to those in a conventional device not provided with such a large touch-panel display 130). (2) Concepts of the pieces of information displayed on respective ones of the five areas are common among different operational modes, so that smooth operation by the user without any confusion becomes possible even in different operational modes. (3) The display of "function selecting area" is given in two or more display modes in which the area size is changed, so that the size of "preview area" can be changed, whereby the function setting information and preview information can accurately be transmitted to the user. (4) The "function selecting area," "action panel area" and "task trigger area" are arranged around the "preview area" at the center, and it is possible to select a function on an area arranged on one side ("function selecting area"), to confirm the process attained by the function by the preview at the central area, and to request execution of the process on the area arranged on the other side ("action panel area" and "task trigger area"). In the following, the arrangement of basic layout will be described.

[Basic Layout Arrangement]

Figure 4:
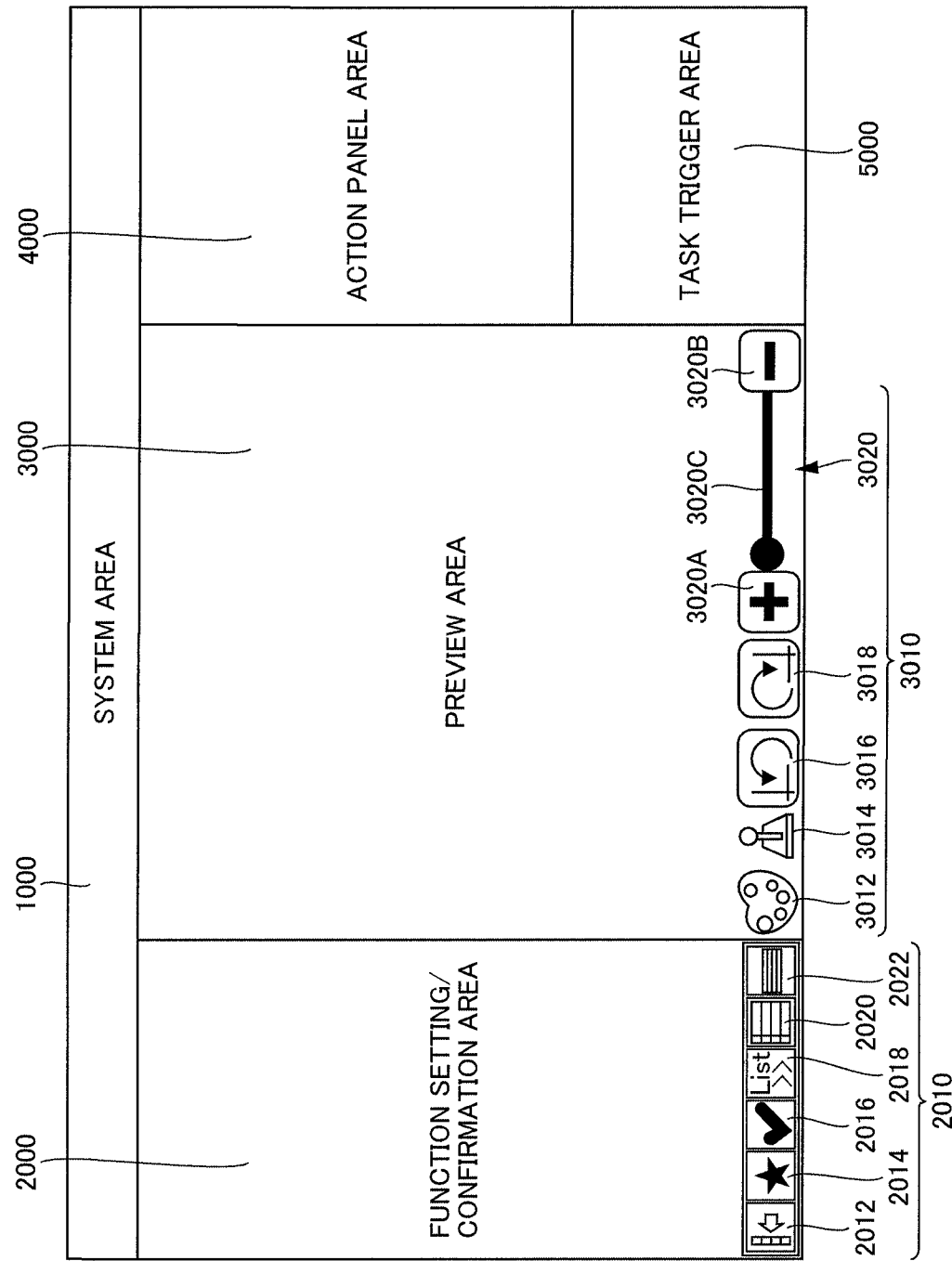
FIG. 4 shows display areas of a touch-panel display of the image forming apparatus shown in FIG. 1.

FIG. 4 shows a basic layout on touch-panel display 130 of image forming apparatus 100. Referring to FIG. 4, the basic layout of landscape-oriented touch-panel display 130 (for example, of 1024 pixels×600 pixels) includes: system area 1000 arranged at the uppermost portion; preview area 3000 arranged at the center of the screen image; function setting/confirmation area 2000 (hereinafter referred to as function selecting area 2000) placed on the left side of preview area 3000; action panel area 4000 placed on the upper right side of preview area 3000; and task trigger area 5000 placed on the lower right side of preview area 3000. The number of areas is not limited to five, the arrangement on the left and right sides is not limited to the above, and the layout may be customized to facilitate user operation. For instance, system area 1000 may be positioned at the lowermost portion of the screen image.

On system area 1000, pieces of information related to the current status of image forming apparatus 100, title of the operational mode that is being selected, and state of image forming apparatus 100 are displayed. By way of example, on system area 1000, an operational mode name, an interruption key, a log-in user name, status of a currently processed job, state of use of an internal memory, time and the like are displayed.

On function selecting area 2000, a function selection menu (icons, buttons, screen image for setting items, screen image of a function list and the like) operated by the user for setting each function, switching display and confirming setting, is displayed with the manner of display changed depending on whether it is in an icon mode, a regular mode or an express mode. In the icon mode, only the icons for setting functions are displayed in function selecting area 2000, so as to ensure the widest preview area 3000. In the express mode, a large screen image allowing setting of functions at one time is displayed in function selecting area 2000, while preview area 3000 is made the smallest. In the regular mode, the size of preview area 3000 is medium size between that in the icon mode and that in the express mode. In function selecting area 2000, function names are displayed in text, together with the icons for setting functions.

In the regular mode, the function names may be displayed in text only (without displaying the icons for setting functions).

Switching among the icon mode, regular mode and express mode is done based on an operation by the user. Specifically, the size of preview area 3000 is changed in accordance with the user's operation. Since icons can transmit pieces of information to the user in a small area, it is preferred to prepare icons for all functions, so as to allow display of preview area 3000 in a large size.

At a lower portion of function selecting area 2000, a group of change buttons 2010 are provided, for changing style of display of function selecting area 2000. Among the group of change buttons 2010, provided are: an icon mode entering button 2012 for displaying function selecting area 2000 in the icon mode; a "favorite" button 2014 for displaying functions registered as "favorites"; a check button 2016 for displaying a function of which setting has been changed; a list button 2018 for displaying a list of all functions that can be set in the selected operational mode; a regular mode entering button 2020 for displaying function selecting area 2000 in the regular mode; and an express mode entering button 2022 for displaying function selecting area 2000 in the express mode. Details of these three display modes (icon mode, regular mode and express mode) will be described later.

If a large amount of information is to be displayed on function selecting area 2000, pieces of information are displayed in an upward/downward scrollable manner. In that case, the group of change buttons 2010 are not scrolled but constantly displayed at the lowermost portion of function selecting area 2000.

In preview area 3000, an image of expected document output (finished form) is displayed. Specifically, an image is displayed using dummy data or scanned data. Every time the user designates the manner of finish, the image displayed on preview area 3000 changes. Preview area 3000 has two display modes, that is, a virtual mode before scanning, in which finished form of a dummy image is displayed, and a scan-in mode after scanning, in which finished form of the actual image is displayed. The virtual mode has two types, that is, before setting an original document and after setting an original document.

At a lower portion of preview area 3000, a group of preview changing buttons 3010 are arranged, for changing the style of display of preview area 3000. Among the group of preview changing buttons 3010, provided are: a left-turn button 3016 for turning the preview 90 degrees to the left; a right-turn button 3018 for turning the preview 90 degrees to the right; and a zoom bar 3020. In addition to these buttons, a color changing button 3012 and preview operation button 3014, for example, are provided.

When left-turn button 3016 is touch-operated once, the preview is turned 90 degrees to the left, and when touch-operated twice, the preview is turned 180 degrees to the left (vertically flipped). Similarly, when the image of finished document displayed on the preview area is gesture-operated (when the document image is rotated 180 degrees counter-clockwise by one's finger), the preview is turned 180 degrees to the left (vertically flipped).

When right-turn button 3018 is touch-operated once, the preview is turned 90 degrees to the right, and when touch-operated twice, the preview is turned 180 degrees to the right (vertically flipped). Similarly, when the image of finished document displayed on the preview area is gesture-operated (when the document image is rotated 180 degrees clockwise by one's finger), the preview is turned 180 degrees to the right (vertically flipped).

When a plus button 3020A of zoom bar 3020 is touch-operated or if bar 3020C is gesture-operated (slid) to the side of plus button 3020A, the preview is displayed in an enlarged size. Similarly, when the image of finished document displayed on the preview area is gesture-operated (when the document image is pinched-out/pinched-open by fingertips), the preview is displayed in an enlarged size.

When a minus button 3020B of zoom bar 3020 is touch-operated or if bar 3020C is gesture-operated (slid) to the side of minus button 3020B, the preview is displayed in a reduced size. Similarly, when the image of finished document displayed on the preview area is gesture-operated (when the document image is pinched-in/pinched-close by fingertips), the preview is displayed in a reduced size.

If the number of pages of the document image to be displayed on preview area 3000 is large, a display page selection button (a page number input button, page feed button, page return button, single page display button, plural page display button or the like) that can be touch-operated may be displayed. Page feed and page return of the previewed document is also possible by a gesture-operation (flick) of the document image. If the document image displayed on preview area 3000 is large, a scroll bar that can be touch-operated or gesture-operated may be displayed.

On action panel area 4000, pieces of information related to assistance, guidance and suggestion related to the operation are displayed. On action panel area 4000, if, for instance, a user selects a specific function, functions related to the selected function may be displayed, other functions related to the selected function in object-oriented manner may be displayed, or functions selected in the past by the user or a user of a group to which the user belongs in relation to the selected function may be displayed as "recommended functions."

On task trigger area 5000, trigger items operated by the user to actually operate image forming apparatus 100 when all settings are done for the operational mode are displayed. By way of example, a start button (software button) is displayed for starting a process. In an operational mode involving printing (other than facsimile transmission), information related to run out of consumables is also displayed on the "task trigger area," since it leads to a task failure.

Here, it is preferred to display the start button only when the state allows pressing of the start button. The state that allows pressing of the start button refers to a state in which all settings have been done, and consumables (recording paper and toner) are available, in the operational mode involving printing. In the facsimile mode (transmission) as an operational mode not involving printing, the state that allows pressing of the start button is a state in which settings of all transmission parameters including a destination have been done.

The positions where these five areas are arranged are not changed even when the operational mode is changed (not changed in the initial screen image of any operational mode). Similar to the switched display in the icon mode/regular mode/express mode of function selecting area 2000 (and preview area 3000), the size of each area is changed, reduced/enlarged in the lateral direction (longitudinal direction) of touch-panel display 130.

These five areas are arranged in consideration of the flow line of user's viewpoint and the flow line of user's operation, in addition to the user interface of conventional devices. With such an arrangement, the user's viewpoint moves from upper left to lower right, and the user operation (fingertip of the dominant hand) moves from upper left to lower right. This advantageously enables a user-friendly operation.

For making a transition from one operational mode to another, home key 148 is pressed, to select another operational mode on the home screen image. In this manner, the operational mode is switched through the home screen image. In image forming apparatus 100 in accordance with the present embodiment, however, it is possible to make a transition from a screen image of one operational mode to a screen image of another operational mode if an image transmission mode (mail mode, FAX mode, i-FAX mode, shared folder mode, data input mode, FTP mode or desk top mode) is selected, as will be described later. Therefore, it is possible to switch the operational mode between each of the image transmission modes directly, not through the home screen image.

As described above, image forming apparatus 100 is provided with touch-panel display 130 displaying pieces of information in consideration of flow lines of user's viewpoint and user's operation. In order to enable the user to appropriately select an operational mode without confusion on touch-panel display 130, operational mode selection buttons are displayed on the touch-panel display. Such a display process is realized by software executed by using the hardware configuration described above. The software configuration will be described.

[Software Configuration]

Figure 5:
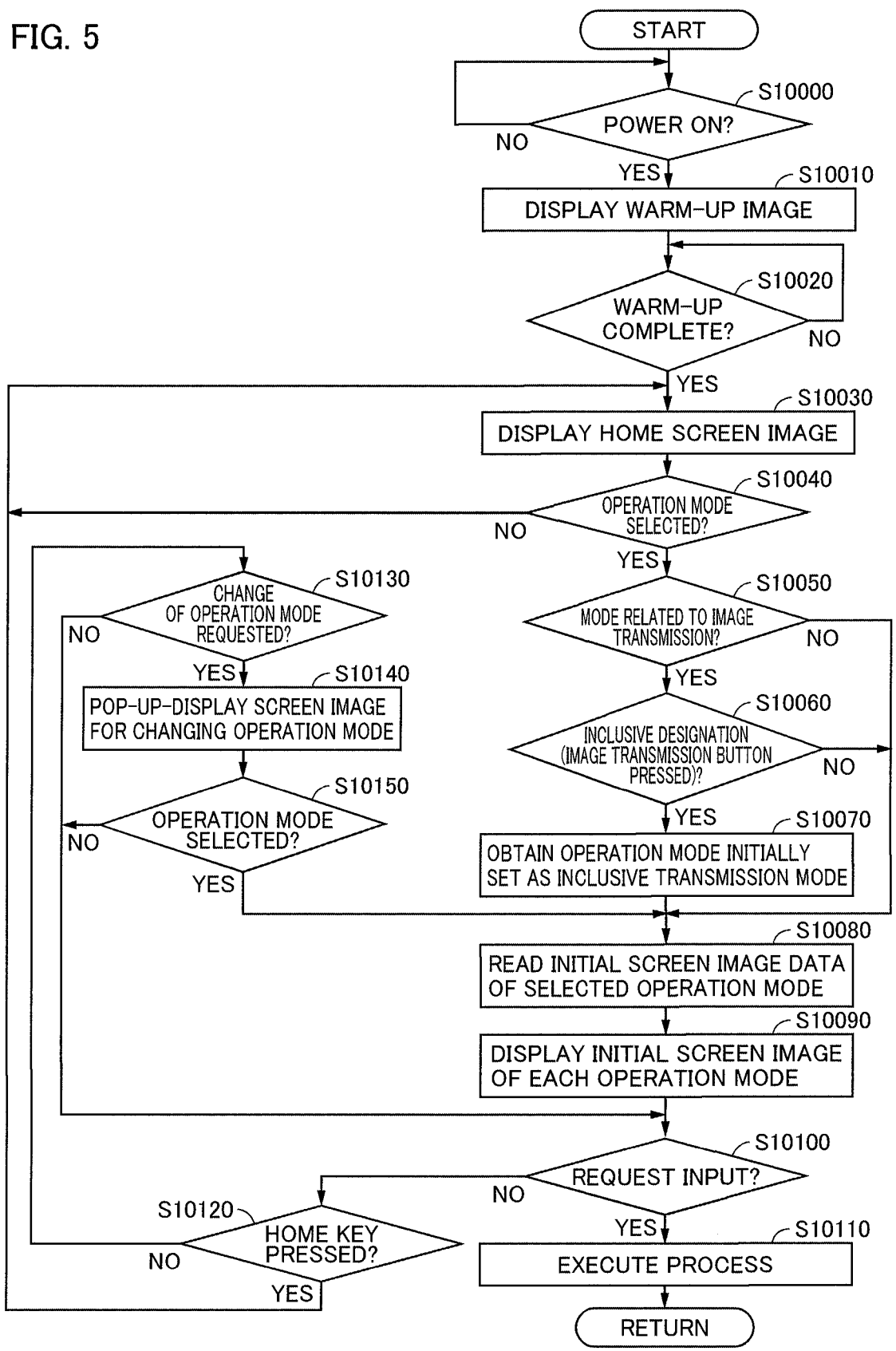
FIG. 5 is a flowchart representing a control structure of a program executed in the image forming apparatus in accordance with an embodiment of the present invention.

FIG. 5 is a flowchart representing a control structure of a program executed by CPU 300 of image forming apparatus 100. CPU 300 of image forming apparatus 100 executes, in parallel with the program, a program for realizing general functions of an image forming apparatus. The program, however, is not directly related to the characteristic portion of the present invention and, therefore, details thereof will not be described here.

Referring to FIG. 5, at step S10000, CPU 300 of image forming apparatus 100 (hereinafter simply referred to as CPU 300) determines whether or not image forming apparatus 100 is powered on. Here, it is assumed that the main power for operating CPU 300 has been on, and when power key 144 is pressed, CPU 300 determines that image forming apparatus 100 is powered on. The determination of YES may be made if the main power is turned on, at step S10000. If it is determined that image forming apparatus 100 is powered on (YES at step S10000), the process proceeds to step S10010. Otherwise (NO at S10000), the process returns to S10000 and waits until it is determined that image forming apparatus 100 is powered on.

At step S10010, CPU 300 displays a warm-up screen image on touch-panel display 130. While the warm-up screen image is displayed on touch-panel display 130, by way of example, a system check process and the process of supplying electric power to the heater to heat heating roller 248 are executed.

At step S10020, CPU 300 determines whether or not warm-up is complete. If it is determined that warm-up is complete (YES at step S10020), the process proceeds to step S10030. Otherwise (NO at step S10020), the process returns to step S10020 and waits until warm-up is complete.

At step S10030, CPU 300 displays the home screen image on touch-panel display 130. At step S10040, CPU 300 determines whether or not an operational mode is selected. CPU 300 determines that an operational mode is selected when an icon (an icon representing an operational mode) displayed on the home screen image is touched, tapped or double-tapped. If it is determined that an operational mode is selected (YES at step S10040), the process proceeds to step S10050. Otherwise (NO at step S10040), the process returns to step S10030, and display of the home screen image is continued. As to the icon operation, any gesture operation other than touching, tapping and double-tapping is not excluded. Any touch-operation or gesture-operation on touch-panel display 130 may be done. Simple description of "pressing" may refer to any of these operations. Characteristic arrangement of home screen image displayed on touch-panel display 130 at step S10030 will be described later.

At step S10050, CPU 300 determines whether or not the selected operational mode is related to image transmission. Here, if any of the image transmission icon, E-mail icon, FAX icon, i-FAX icon, shared folder icon, data input icon, FTP icon and desk top icon among the icons displayed on the home screen image (icons representing operational modes) is touched, tapped or double-tapped, CPU 300 determines that an operational mode related to image transmission is selected. If it is determined that an operational mode related to image transmission is selected (YES at step S10050), the process proceeds to step S10060. Otherwise (NO at step S10050), the process proceeds to step S10080.

At step S10060, CPU 300 determines whether or not the selection of a mode related to image transmission is an inclusive designation. Here, if the image transmission icon displayed on the home screen image is touched, tapped or double-tapped, CPU 300 determines that it is an inclusive designation. If it is determined to be an inclusive designation (YES at step S10060), the process proceeds to step S10070. Otherwise (NO at step S10060), the process proceeds to step S10080.

At step S10070, CPU 300 obtains an operational mode set in advance as the inclusive transmission mode, based on information stored, for example, in HDD 302. As the inclusive transmission mode, an operational mode related to image transmission frequently selected in image forming apparatus 100 is set. Though not limiting, in the present embodiment, FAX mode (one of the modes related to image transmission) is set to be the inclusive transmission mode in advance by the user. The setting may be appropriately changed by the user (preferably by an administrator). The inclusive transmission mode set in this manner may be designated freely by the user in accordance with his/her priority and, therefore, it may be regarded as a preferred transmission mode set by the user. Particularly, if a mode related to image transmission that is frequently selected is set to be the inclusive transmission mode, the inclusive transmission mode as such is, from the viewpoint of the user who wants to select it with priority, the transmission mode with priority.

At step S10080, CPU 300 reads the initial screen image data of the selected operational mode, which is among the initial screen image data stored, for example, in HDD 302. At step S10090, CPU 300 displays the initial screen image of the selected operational mode using the read initial screen image data, on touch-panel display 130.

At step S10100, CPU 300 determines whether or not any request is input in the selected operational mode. If it is determined that a user request is input (YES at step S10100), the process proceeds to step S10110. Otherwise (NO at step S10100), the process proceeds to step S10120.

At step S10110, CPU 300 executes the process requested by the user, in image forming apparatus 100. Then, the process ends.

At step S10120, CPU 300 determines whether or not the home key is pressed. If it is determined that the home key is pressed (YES at step S10120), the process returns to step S10030. Otherwise (NO at step S10120), the process proceeds to step S10130.

At step S10130, CPU 300 determines whether or not a request for changing the operational mode related to image transmission has been detected. Here, if the operational mode display area displayed in the condition setting screen image for the operational mode related to image transmission is touched, tapped or double-tapped by the user, CPU 300 determines that a request for changing the operational mode is detected. If it is determined that the request for changing the operational mode is detected (YES at step S10130), the process proceeds to step S10140. Otherwise (NO at step S10130), the process proceeds to step S10100.

At step S10140, CPU 300 displays a pop-up screen image for changing operational mode, on touch-panel display 130. Here, a list of modes related to image transmission is displayed in the pop-up screen image.

At step S10150, CPU 300 determines whether or not one of the operational modes related to image transmission displayed in the pop-up image screen is selected. Here, if one of the operational modes related to image transmission displayed in the pop-up screen image is touched, tapped or double-tapped by the user, CPU 300 determines that an operational mode is selected. If it is determined that one of the operational modes displayed in the pop-up screen image is selected (YES at step S10150), the process proceeds to step S10080. Otherwise (NO at step S10150), the process proceeds to step S10100.

It is also possible to display a log-in screen image at the completion of warm-up (YES at S10020). Though the log-in operation after completion of warm-up is not described in the following, it is assumed that log-in is required of the user to use image forming apparatus 100.

Further, the request input by the user at step S10100 may include a request before printing that does not necessarily cause the actual printing by image forming apparatus 100, such as a change in the display mode of function selecting area 2000, function setting on function selecting area 2000, and a change in the manner of displaying the preview on preview area 3000. If such a request before printing is made, corresponding operation is done at step S10110, and after step S10110, the process returns to step S10100 to wait for an input of a further request (eventually the request for printing).

[Operation]

The operation of image forming apparatus 100 in accordance with the present embodiment based on the configuration and flowchart as above will be described with reference to the exemplary displays on touch-panel display 130 shown in FIGS. 6 to 16. In the exemplary displays, the same reference characters represent the same display item names. Description of the same display items will not be repeated.

—Home Screen Image Display Operation—

When the user presses power key 144 of image forming apparatus 100 (YES at step S10000), the warm-up screen image is displayed on touch-panel display 130 (step S10010) until warm-up is complete (NO at step S10020). At this time, it is preferred that image forming apparatus 100 prepares pieces of information that can be displayed even during system check and useful for the user who is going to use image forming apparatus 100 as warm-up screen image, and that the warm-up screen image including such pieces of information is displayed on touch-panel display 130.

Figure 6:
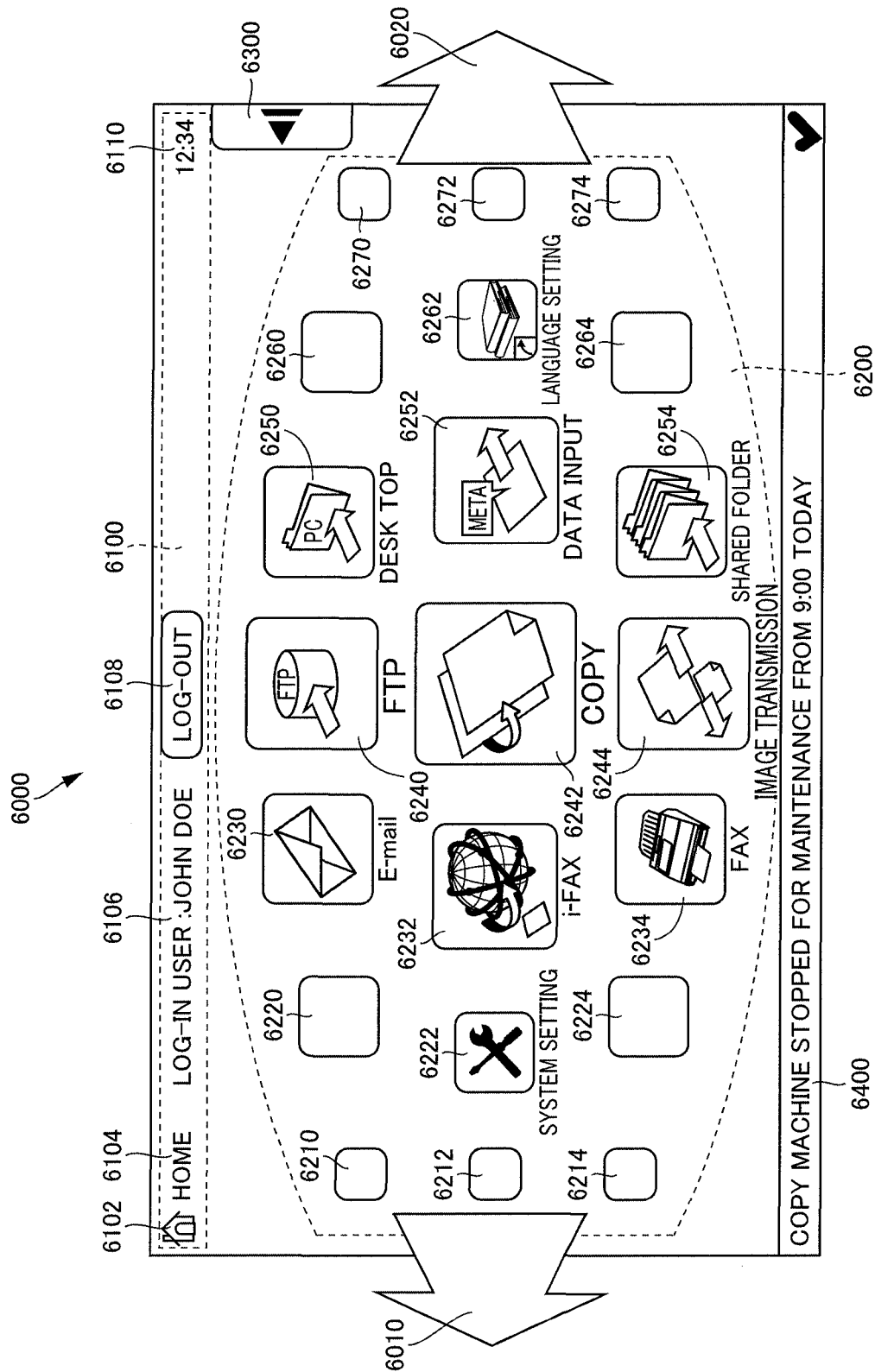
FIG. 6 shows a home screen image displayed on the touch-panel display of the image forming apparatus in accordance with the embodiment of the present invention.

When warm-up is complete (YES at step S10020), the home screen image is displayed on touch-panel display 130 (step S10030). At this time, on touch-panel display 130, a home screen image 6000 such as shown in FIG. 6 is displayed. As shown in FIG. 6, on home screen image 6000, not all of the five areas of the layout described above are displayed, and icons (icons representing operational modes) allowing selection of an operational mode are displayed on most part of touch-panel display 130, regardless of the five areas.

Referring to FIG. 6, home screen image 6000 includes a home system area 6100 corresponding to the system area described above, an icon display area 6200, an icon display switching tub-button 6300, and a memo display area 6400.

On home system area 6100, an area 6102 displaying an icon representing the home screen image, an area 6104 displaying the name of the displayed screen image, an area 6106 displaying the logged-in user name, an area 6108 displaying a log-out button (software button), and an area 6110 displaying the current time, are arranged.

On icon display area 6200, icons 6210-6274 representing operational modes are displayed together with the names or abbreviations of the operational modes. The name or abbreviation of the operational mode is not indispensable. In the present embodiment, the operational mode mainly includes, in addition to the maintenance mode (system setting, language setting and the like), the copy mode and the operational modes related to image transmission (mail mode, FAX mode, i-FAX mode, shared folder mode, data input mode, FTP mode, and desk top mode). Therefore, an icon 6242 for selecting the copy mode, and an icon 6244 for inclusively selecting the operational mode related to image transmission are displayed on icon display area 6200. Further, in icon display area 6200, an icon 6230 for directly selecting the mail mode, an icon 6232 for directly selecting the i-FAX mode, an icon 6234 for directly selecting the FAX mode, an icon 6240 for directly selecting the FTP mode, an icon 6252 for directly selecting the data input mode, an icon 6254 for directly selecting the shared folder mode, and an icon 6250 for directly selecting the desk top mode, are displayed. The present invention is not limited to the icons shown in home screen image 6000 of FIG. 6.

Here, icon 6242 is an icon for selecting the copy mode as the final operational mode that does not necessitate further selection of an operational mode (though setting of conditions may be necessary), and icon 6244 is an icon with priority for selecting an operational mode related to image transmission to which priority is given. As described above, when icon 6244 is pressed, it is assumed that FAX mode, which is set in advance as highly frequently selected mode, is selected, and corresponding process is done. The process is the same when icon 6234 is pressed.

As will be described later, in the condition setting screen image in the FAX mode, transition to another mode related to image transmission is readily possible (transition to another mode related to image transmission is readily possible also from a mode related to image transmission other than the FAX mode). Such a transition means that an operational mode with priority is first selected by the priority icon, and then, a final operational mode is selected. Therefore, icon 6244 can be regarded as an inclusive icon for selecting a further operational mode, rather than a final operational mode. Further, icons 6230, 6232, 6234, 6240, 6250, 6252 and 6254 are icons for selecting modes related to image transmission as final operational modes, not requiring further selection of a further operational mode.

As shown in FIG. 6, in icon display area 6200, icons on the central column (for example, icons 6240, 6242 and 6244) are displayed larger than icons on the left and right sides thereof (for example, icons 6230 and 6250 with respect to icon 6240, icons 6232 and 6252 with respect to icon 6242, and icons 6234 and 6254 with respect to icon 6244). In icon display area 6200, icons at the central row (for example, icons 6232, 6242 and 6252) are displayed larger than icons on the upper and lower sides thereof (for example, icons 6230 and 6234 with respect to icon 6232, icons 6240 and 6244 with respect to icon 6242, and icons 6250 and 6254 with respect to icon 6252). In this manner, in icon display area 6200, the icons are displayed to be horizontally and vertically symmetrical in size, with the size being the largest at the center (center at the central column).

When the user makes a flick operation to the left with his/her finger on icon display area 6200 displayed on the screen of touch-panel display 130, icons displayed on the screen move as if they flow in the direction indicated by an arrow 6010. When the user makes a flick operation to the right, icons displayed on the screen move as if they flow in the direction indicated by an arrow 6020. The distance of movement is determined, for example, in accordance with the width of movement of the fingertip in the flick operation. The distance of movement may be a prescribed distance set in advance for one flick operation. If a manner of display in which a plurality of icons are arranged on a virtual cylinder is adopted for icon display area 6200, it becomes possible to display the icons in an endless manner.

On memo display area 6400, a piece of maintenance information or the like to be notified to every user of image forming apparatus 100 is displayed.

Figure 7:
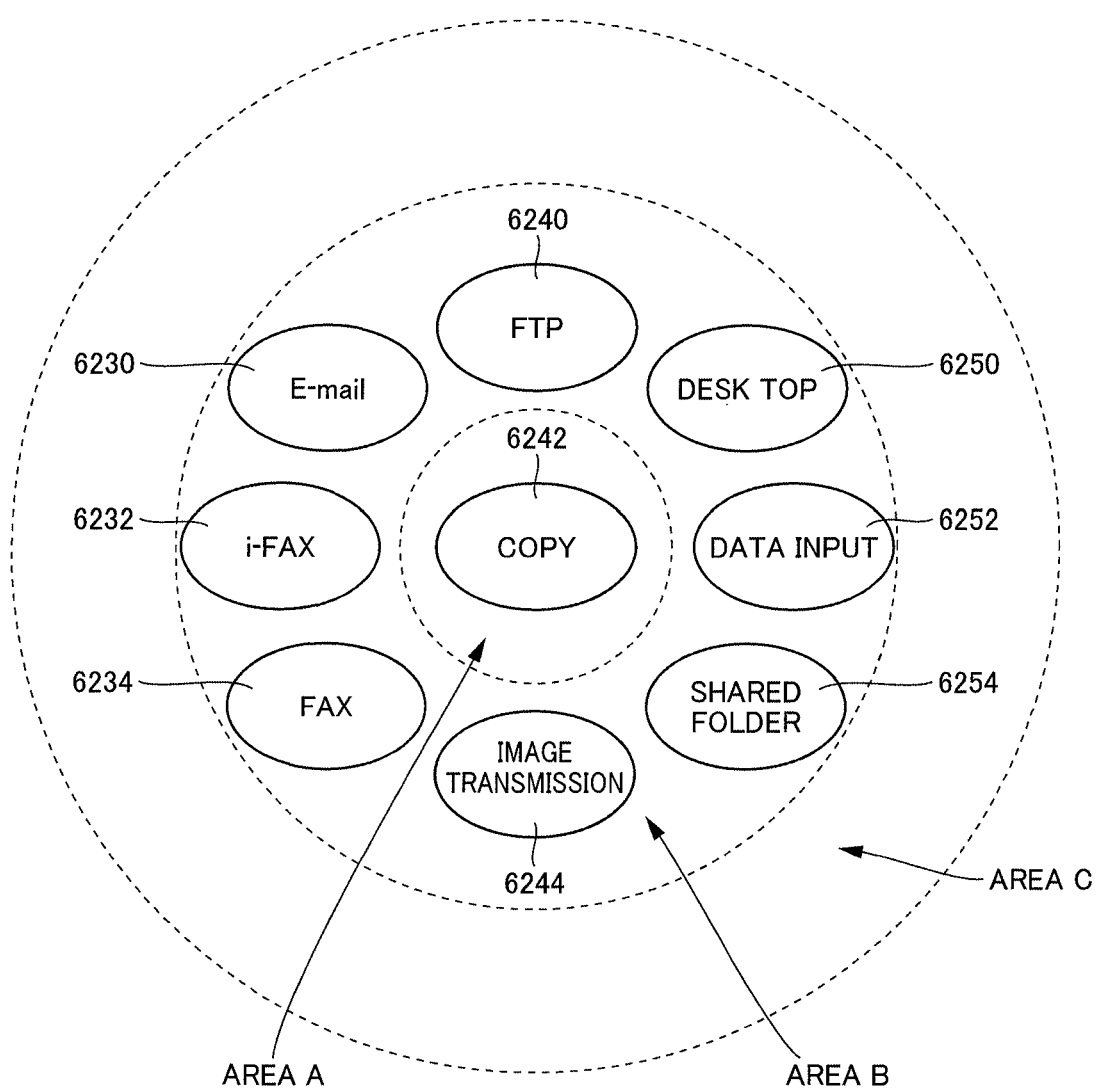
FIG. 7 shows concepts of arrangement on the home screen image shown in FIG. 6.

Referring to FIG. 7, the arrangement of icons on home screen image 6000 shown in FIG. 6 will be described. As can be seen from FIG. 7, when home screen image 6000 shown in FIG. 6 is displayed on touch-panel display 130, icon 6242 for selecting the copy mode is arranged in area A at the center, and icon 6244 for inclusively selecting the operational mode related to image transmission is arranged immediately therebelow (on the side closest to the user). In a ring-shaped area B in which icon 6244 is positioned, icons 6230, 6232, 6234, 6240, 6250, 6252 and 6254 for directly selecting an operational mode related to image transmission are arranged in concentric manner. It is also possible to arrange a group of other icons in an area C outside area B.

As shown in FIG. 7, home screen image 6000 includes direct icons (icons 6242, 6230, 6232, 6234, 6240, 6250, 6252 and 6254) causing direct transition to a screen image of the operational mode requested by the user, and an inclusive icon (here, icon 6244) causing a transition to a screen image of an operational mode (here, FAX mode) set in advance as a mode related to image transmission displayed with priority among a plurality of paths for image transmission. With icon 6242 for making a transition to the copy mode displayed at the central area A, the icons for making a transition to the screen image of operational modes related to image transmission are provided in area B therearound, and the inclusive icon (here, icon 6244) among the icons related to image transmission is arranged on the lower side closest to the user (so that other direct icons are not hidden by one's hand). Thus, an operation setting path through which the final operational mode is selected from the inclusive icon as in the conventional MFP, and an operation setting path for directly selecting an operational mode without any hardware button as in the image forming apparatus 100 of the present embodiment are both provided. Therefore, both conventional users and new users can select without confusion the operational mode of image forming apparatus 100 in accordance with the present embodiment. Since the copy mode and the mode related to image transmission providing different results of output from image forming apparatus 100 are displayed broadly divided from each other (with the copy mode arranged at the center and the modes related to image transmission arranged therearound), selection of an operational mode does not cause any confusion. Since the inclusive icon allowing selection of an operational mode related to image transmission with the same feeling as in the conventional MFP is arranged on the side of the user, the direct icons are not hidden by the user's hand but visible when a conventional user operates the inclusive icon with the same feeling as in the conventional apparatus. Therefore, the user may notice the new option for operation (direct selection of an operational mode). If the user notices and tries the new option, he/she will be accustomed to the new manner of operation.

—Operation of Displaying Initial Screen Image in Each Operational Mode—

Copy Mode

If icon 6242 shown in FIG. 6 is touched, tapped or double tapped by the fingertip of a user, it is determined that the operational mode is selected (YES at step S10040), and that the selected operational mode is not related to image transmission (NO at step S10050). Using the copy initial screen image data read from HDD 302 or the like, the initial screen image of copy mode is displayed on touch-panel display 130 (steps S10080 and S10090). Here, an initial screen image for the copy mode is displayed on touch-panel display 130.

Mail Mode

Figure 8:
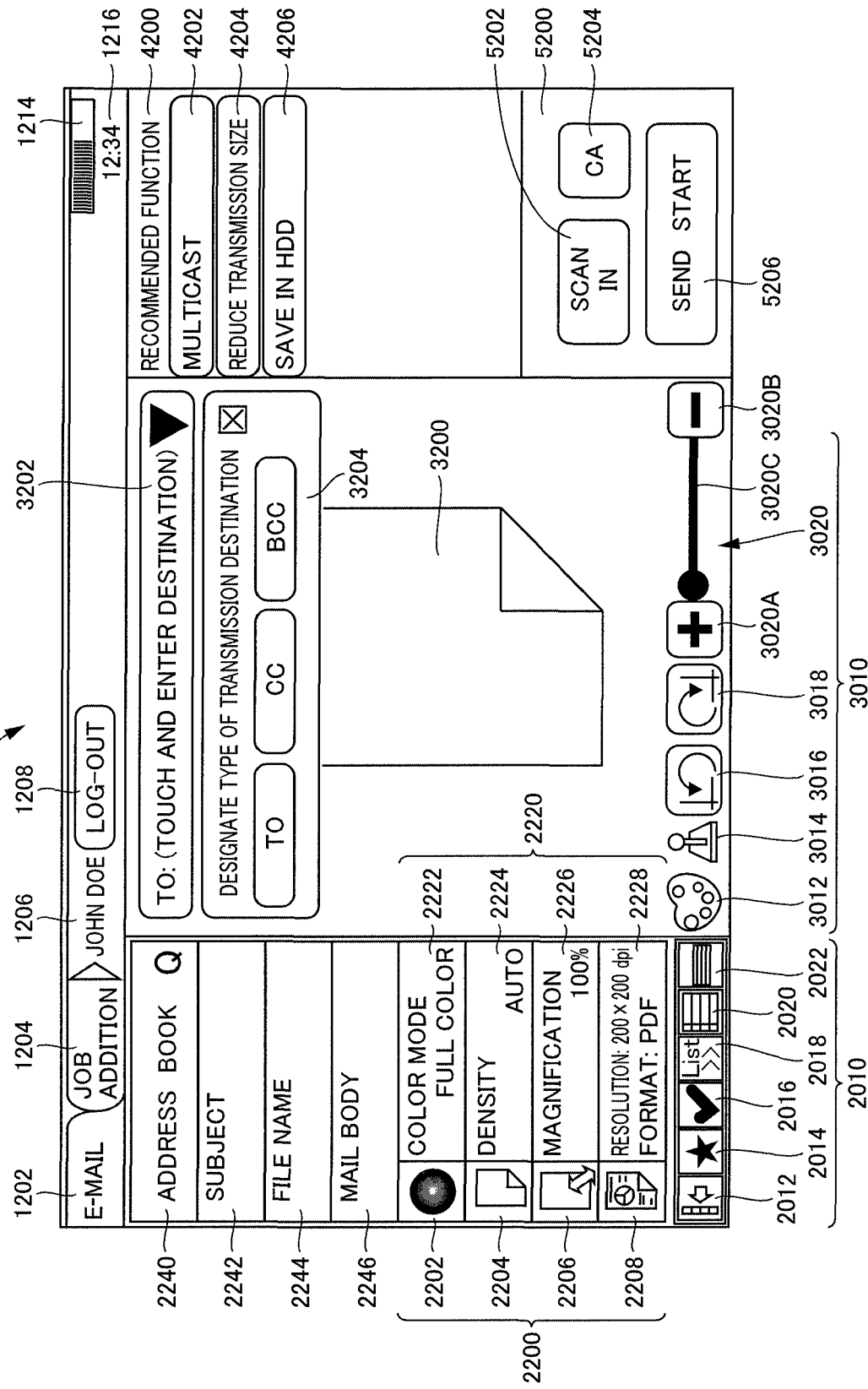
FIG. 8 shows a mail mode initial screen image displayed in the regular mode, displayed on the touch-panel display of the image forming apparatus in accordance with the embodiment of the present invention.

If icon 6230 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using mail mode initial screen image data read from HDD 302 or the like, the initial screen image for the mail mode is displayed on touch-panel display 130 (steps S10080 and S10090). By way of example, an initial screen image for the mail mode shown in FIG. 8 is displayed on touch-panel display 130. As shown in FIG. 8, mail mode initial screen image 7200 is divided into five areas of the layout described above, on which pieces of information are displayed.

Referring to FIG. 8, on system area 1000 of mail mode initial screen image 7200, an area 1202 indicating the selected operational mode (here, mail mode), an area 1204 displaying sub information related to the selected operational mode, an area 1206 displaying the logged-in user name, an area 1208 displaying a log-out button (software button), an area 1214 displaying communication state, and an area 1216 indicating the current time, are arranged.

In area 1204, a key (software button) for adding a job is displayed, as the sub information. If the interruption key is touched, tapped or double-tapped, a process for designating a job to be added in the mail mode can be executed.

In function selecting area 2000 of mail mode initial screen image 7200, a function selection menu allowing selection by the user in the mail mode and the group of change buttons 2010 described above are displayed. In the screen image shown in FIG. 8, the function selection menu is displayed in the regular mode.

As shown in FIG. 8, the function selection menu displayed in the regular mode includes a group of icons 2200 and a group of texts 2220. In the function selection menu displayed on function selecting area 2000, corresponding to an icon 2202 for setting the color mode of a document to be transmitted as an attachment file of a mail, a text 2222 showing the set contents is displayed. Corresponding to an icon 2204 for setting the density of a document to be transmitted as an attachment file of a mail, a text 2224 showing the set contents is displayed. Corresponding to an icon 2206 for setting the magnification of a document to be transmitted as an attachment file of a mail, a text 2226 showing the set contents is displayed. Corresponding to an icon 2208 for setting the type of a document to be transmitted as an attachment file of a mail, a text 2228 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of mail mode initial screen image 7200, a button 2240 for displaying an address book used for designating a mail address, a button 2242 for designating a mail subject, a button 2244 for designating a file to be attached to a mail, and a button 2246 for inputting a main body of a mail are displayed.

When button 2240 is touched, tapped or double-tapped, from address books stored in image forming apparatus 100, only the destinations having mail addresses stored are extracted and a resulting address book is displayed.

When button 2242 is touched, tapped or double-tapped, a text input screen image is displayed, allowing input of a subject of the mail. When button 2244 is touched, tapped or double-tapped, a file name designating screen image is displayed, allowing designation of a file name. When button 2246 is touched, tapped or double-tapped, a text input screen image is displayed, allowing input of a main body of the mail.

In preview area 3000 of mail mode initial screen image 7200, an image of expected document output (finished form) 3200 is arranged. Here, image 3200 is displayed using dummy data or scanned data. Every time the user changes the function setting menu of function selecting area 2000, image 3200 is changed and displayed on preview area 3000 (preview display is changed).

In addition to image 3200, in preview area 3000 of mail mode initial screen image 7200, a button 3202 for inputting a mail destination is displayed. When button 3202 is touched, tapped or double-tapped, a text input screen image is displayed, allowing direct input of a mail destination, or selection from an address book. Further, on preview area 3000 of mail mode initial screen image 7200, an area 3204 for designating the type of destination is displayed. The user operates area 3204 to designate the type of transmission destination (address, CC address or BCC address).

In action panel area 4000 of mail mode initial screen image 7200, pieces of information related to assistance, guidance and suggestion related to the mail operation are displayed. As shown in FIG. 8, recommended functions in the mail mode selected by the user are displayed. In action panel area 4000, an area 4200 showing the contents of displayed information, and areas 4202 to 4204 showing, as texts, the recommended functions and serving as software buttons are arranged.

When area 4202 is touched, tapped or double-tapped, detailed information of multicast mail transmission is pulled-down and displayed. When area 4204 is touched, tapped or double-tapped, detailed information related to an operation of reducing the size of data to be attached to the mail is pulled-down and displayed. When area 4206 is touched, tapped or double-tapped, detailed information related to an operation of saving a document to be transmitted attached to a mail in HDD 302 is pulled-down and displayed.

In task trigger area 5000 of mail mode initial screen image 7200, a group of execution buttons 5200 are displayed. The group of execution buttons 5200 includes: a scan-in key (software button) 5202 for operating image forming apparatus 100 to scan a document and obtain image data; a clear-all key (software button) 5204, for clearing set function or functions; and a transmission start key (software key) 5206 for operating image forming apparatus 100 to scan a document and transmit it as an attachment to a mail.

If a user inputs a request (YES at step S10100) on mail mode initial screen image 7200 displaying pieces of information in five divided areas as described above, a mail process is executed in accordance with the request (step S10110).

Fax Mode

If icon 6234 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be the inclusive designation (NO at step S10060), and using FAX initial screen image data read from HDD 302 or the like, the FAX mode initial screen image is displayed on touch-panel display 130 (steps S10080 and S10090).

In image forming apparatus 100 in accordance with the present embodiment, the FAX mode is set in advance as the inclusive transmission mode. When icon 6244 shown in FIG. 6 is touched, tapped or double-tapped by the user, it is determined that an operational mode is selected (YES at step S10040), and that the selected operational mode is related to image transmission (YES at step S10050). Further, it is determined to be the inclusive designation (YES at step S10060), and the operational mode set as the inclusive transmission mode (here, FAX mode) is obtained (step S10070). Using the FAX initial screen image data read from HDD 302 or the like, the FAX mode initial screen image is displayed on touch-panel display 130 (steps S10080 and S10090).

Figure 9:
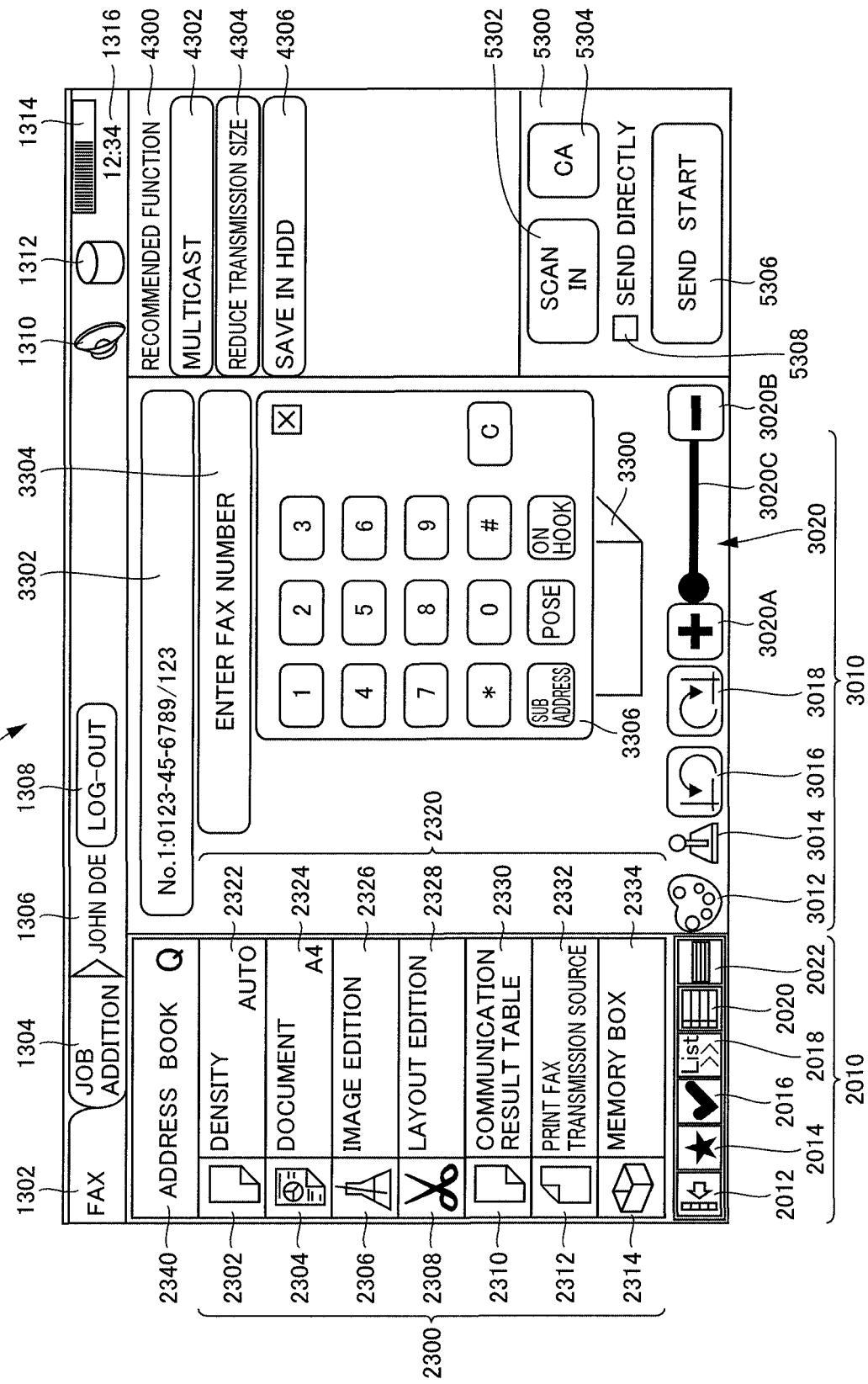
FIG. 9 shows a FAX mode initial screen image displayed in the regular mode, displayed on the touch-panel display of the image forming apparatus in accordance with the embodiment of the present invention.

By way of example, an initial screen image 7300 for the FAX mode shown in FIG. 9 is displayed on touch-panel display 130. As shown in FIG. 9, FAX mode initial screen image 7300 is divided into five areas of the layout described above, on which pieces of information are displayed.

Referring to FIG. 9, on system area 1000 of FAX mode initial screen image 7300, an area 1302 indicating the selected operational mode (here, FAX mode), an area 1304 displaying sub information related to the selected operational mode, an area 1306 displaying the logged-in user name, an area 1308 displaying a log-out button (software button), an area 1310 displaying a volume adjustment button at the time of on-hook, an area 1312 displaying free memory space, an area 1314 displaying communication state, and an area 1316 indicating the current time, are arranged.

In area 1304, a key (software button) for adding a job is displayed, as the sub information. If the interruption key is touched, tapped or double-tapped, a process for designating a job to be added in the FAX mode can be executed.

When the volume adjustment button displayed in area 1310 is touched, tapped or double-tapped, a slide bar for adjusting volume at the time of on-hook is displayed.

In function selecting area 2000 of FAX mode initial screen image 7300, a function selection menu allowing selection by the user in the FAX mode and the group of change buttons 2010 described above are displayed. In the screen image shown in FIG. 9, the function selection menu is displayed in the regular mode.

As shown in FIG. 9, the function selection menu displayed in the regular mode includes a group of icons 2300 and a group of texts 2320. In the function selection menu displayed on function selecting area 2000, corresponding to an icon 2302 for setting the density of a FAX document, a text 2322 showing the set contents is displayed. Corresponding to an icon 2304 for setting the type of FAX document, a text 2324 showing the set contents is displayed. Corresponding to an icon 2306 for image edition, a text 2326 showing the set contents is displayed. Corresponding to an icon 2308 for layout edition, a text 2328 showing the set contents is displayed. For an icon 2310 for displaying result of FAX communication, corresponding text 2330 is displayed. For an icon 2312 for printing information of FAX transmission source on a FAX document, corresponding text 2332 is displayed. For an icon 2314 for displaying information stored in a memory box, corresponding text 2334 is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of FAX mode initial screen image 7300, a button 2340 for displaying an address book used to designate a telephone number of FAX destination is displayed.

When button 2340 is touched, tapped or double-tapped, from address books stored in image forming apparatus 100, only the destinations having FAX telephone numbers stored are extracted and a resulting address book is displayed.

In preview area 3000 of FAX mode initial screen image 7300, an image of expected document output (finished form) 3300 is arranged. Here, image 3300 is displayed using dummy data or scanned data. Every time the user changes the function setting menu of function selecting area 2000, image 3300 is changed and displayed on preview area 3000 (preview display is changed).

In addition to image 3300, in preview area 3000 of FAX mode initial screen image 7300, an area 3302 displaying an input FAX address and an area 3304 displaying a message asking input of facsimile number are displayed. Further, in preview area 3000 of FAX mode initial screen image 7300, an area 3306 for displaying numeric keys allowing input of a telephone number of FAX destination is displayed. The user operates the area 3306 to input the telephone number of FAX address as the transmission destination. If no FAX address is input, a button allowing input of mail address is displayed on area 3302. By touching, tapping or double-tapping the button, a text input screen image is displayed, allowing direct input of mail address with numeric keys or selection from an address book.

In action panel area 4000 of FAX mode initial screen image 7300, pieces of information related to assistance, guidance and suggestion related to the FAX operation are displayed. As shown in FIG. 9, recommended functions in the FAX mode selected by the user are displayed. In action panel area 4000, an area 4300 showing the contents of displayed information, and areas 4302 to 4306 showing, as texts, the recommended functions and serving as software buttons are arranged.

When area 4302 is touched, tapped or double-tapped, detailed information of multicast FAX transmission is pulled-down and displayed. When area 4304 is touched, tapped or double-tapped, detailed information related to an operation of reducing the size of data to be transmitted by FAX is pulled-down and displayed. When area 4306 is touched, tapped or double-tapped, detailed information related to an operation of saving a document to be transmitted by FAX in HDD 302 is pulled-down and displayed.

In task trigger area 5000 of FAX mode initial screen image 7300, a group of execution buttons 5300 are displayed. The group of execution buttons 5300 includes: a scan-in key (software button) 5302 for operating image forming apparatus 100 to scan a document and obtain image data; a clear-all key (software button) 5304 for clearing set function or functions; a transmission start key (software button) 5306 for operating image forming apparatus 100 to scan a document and transmit it by FAX; and a check box 5308 used for designating direct transmission.

If a user inputs a request (YES at step S10100) on FAX mode initial screen image 7300 displaying pieces of information in five divided areas, a FAX process is executed in accordance with the request (step S10110).

—i-FAX Mode—

Figure 10:
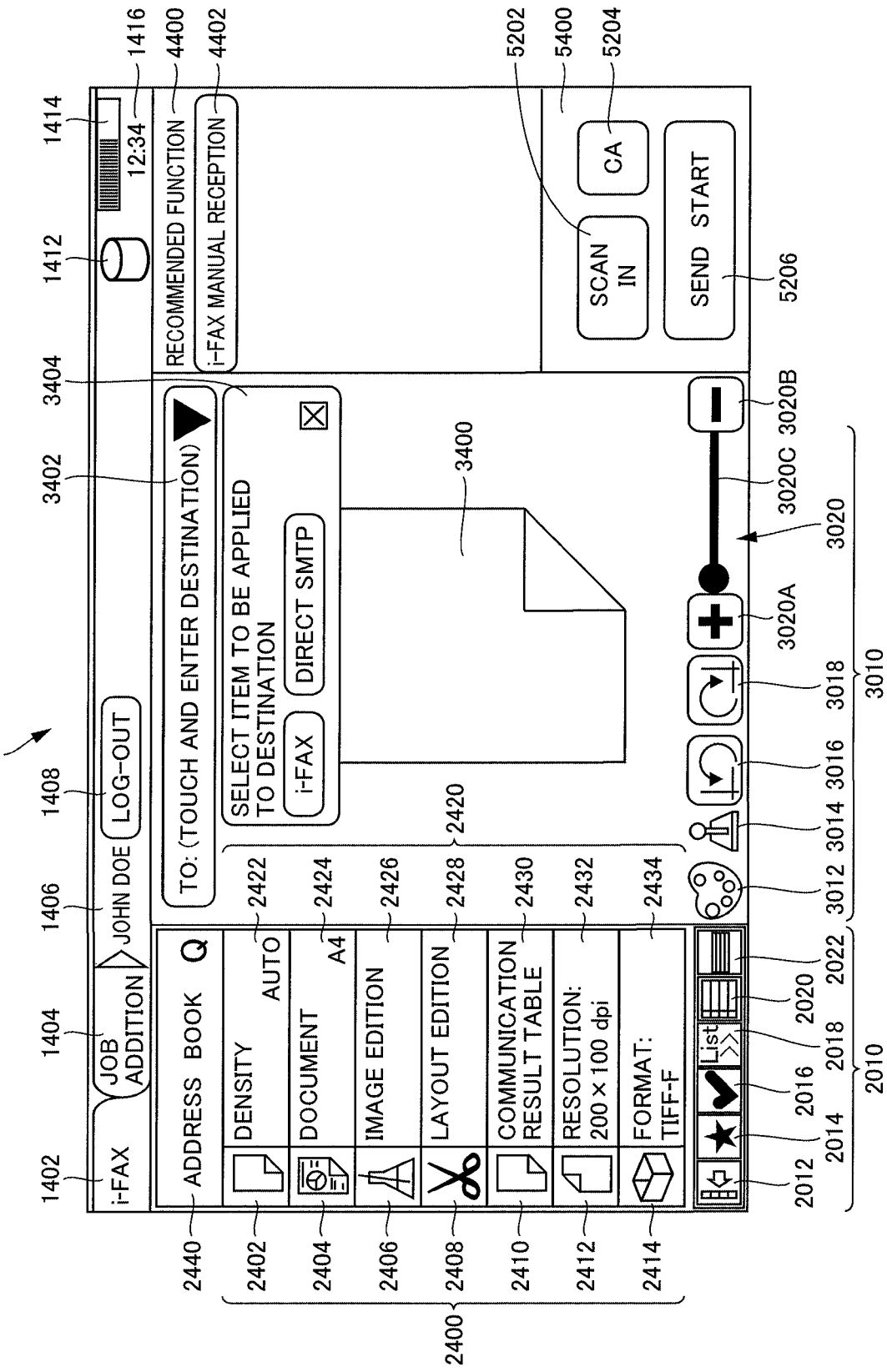
FIG. 10 shows an i-FAX mode initial screen image displayed in the regular mode, displayed on the touch-panel display of the image forming apparatus in accordance with the embodiment of the present invention.

If icon 6232 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using i-FAX initial screen image data read from HDD 302 or the like, the i-FAX mode initial screen image is displayed on touch-panel display 130 (steps S10080 and S10090). Here, by way of example, i-FAX mode initial screen image 7400 shown in FIG. 10 is displayed on touch-panel display 130. As shown in FIG. 10, i-FAX mode initial screen image 7400 is divided into five areas of the layout described above, on which pieces of information are displayed.

Referring to FIG. 10, on system area 1000 of i-FAX mode initial screen image 7400, an area 1402 indicating the selected operational mode (here, i-FAX mode), an area 1404 displaying sub information related to the selected operational mode, an area 1406 displaying the logged-in user name, an area 1408 displaying a log-out button (software button), an area 1412 displaying free memory space, an area 1414 displaying communication state, and an area 1416 indicating the current time, are arranged.

On area 1404, a key (software button) for adding a job is displayed as sub information. When the interruption key is touched, tapped or double-tapped, a process for designating a job to be added in the i-FAX mode can be executed.

In function selecting area 2000 of i-FAX mode initial screen image 7400, the function selection menu allowing user selection in the i-FAX mode and the group of change buttons 2010 described above are displayed. In the screen image shown in FIG. 10, the function selection menu is displayed in the regular mode.

As shown in FIG. 10, the function selection menu displayed in the regular mode includes a group of icons 2400 and a group of texts 2420. In the function selection menu displayed on function selecting area 2000, displayed are: an icon 2402 for setting the density of i-FAX document and a text 2422 showing the set contents; an icon 2404 setting the type of i-FAX document and a text 2424 showing the set contents; an icon 2406 for image edition and a text 2426 showing the set contents; an icon 2408 for layout edition and a text 2428 showing the set contents; an icon 2410 showing the table of communication results of i-FAX and a corresponding text 2430; an icon 2412 showing resolution of i-FAX and a corresponding text 2432; and an icon 2414 showing i-FAX format and a corresponding text 2434. These setting items are examples and the displayed setting items differ depending on the image format usable in the i-FAX mode of image forming apparatus 100 (the format defined, for example, by RFC (Request For Comment) 2301, 2305 and 2532).

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

In addition to the function selection menu, on function selecting area 2000 of i-FAX mode initial screen image 7400, a button 2440 for displaying an address book used for designating a mail address as the destination of i-FAX is displayed.

When button 2440 is touched, tapped or double-tapped, from address books stored in image forming apparatus 100, only the destinations having mail addresses stored as i-FAX transmission destinations are extracted and a resulting address book is displayed.

In preview area 3000 of i-FAX mode initial screen image 7400, an image of expected document output (finished form) 3400 is arranged. Here, image 3400 is displayed using dummy data or scanned data. Every time the user changes the function setting menu of function selecting area 2000, image 3400 is changed and displayed on preview area 3000 (preview display is changed).

In addition to image 3400, in preview area 3000 of i-FAX mode initial screen image 7400, a button 3402 allowing input of i-FAX destination is displayed. When button 3402 is touched, tapped or double-tapped, a text input screen image is displayed, allowing direct input of i-FAX destination or selection from the address book. Further, in preview area 3000 of i-FAX mode initial screen image 7400, an area 3404 for designating items to be applied to the destination is displayed. The user operates the area 3404 to designate an item (i-FAX, direct SMTP) applied to transmission.

In action panel area 4000 of i-FAX mode initial screen image 7400, pieces of information related to assistance, guidance and suggestion related to the i-FAX operation are displayed. As shown in FIG. 10, recommended functions in the i-FAX mode selected by the user are displayed. In action panel area 4000, an area 4400 showing the contents of displayed information, and an area 4402 showing, as text, the recommended functions and serving as software button are arranged. When area 4402 is touched, tapped or double-tapped, detailed information of manual reception of i-FAX is pulled-down and displayed.

In task trigger area 5000 of i-FAX mode initial screen image 7400, a group of execution buttons 5400 are displayed. The group of execution buttons 5400 includes: a scan-in key (software button) 5202 for operating image forming apparatus 100 to scan a document and obtain image data; a clear-all key (software button) 5204, for clearing set function or functions; and a transmission start key (software key) 5206 for operating image forming apparatus 100 to scan a document and to perform the process of i-FAX transmission.

If a user inputs a request (YES at step S10100) on i-FAX mode initial screen image 7400 displaying pieces of information in five divided areas as described above, an i-FAX process is executed in accordance with the request (step S10110).

Shared Folder Mode

Figure 11:
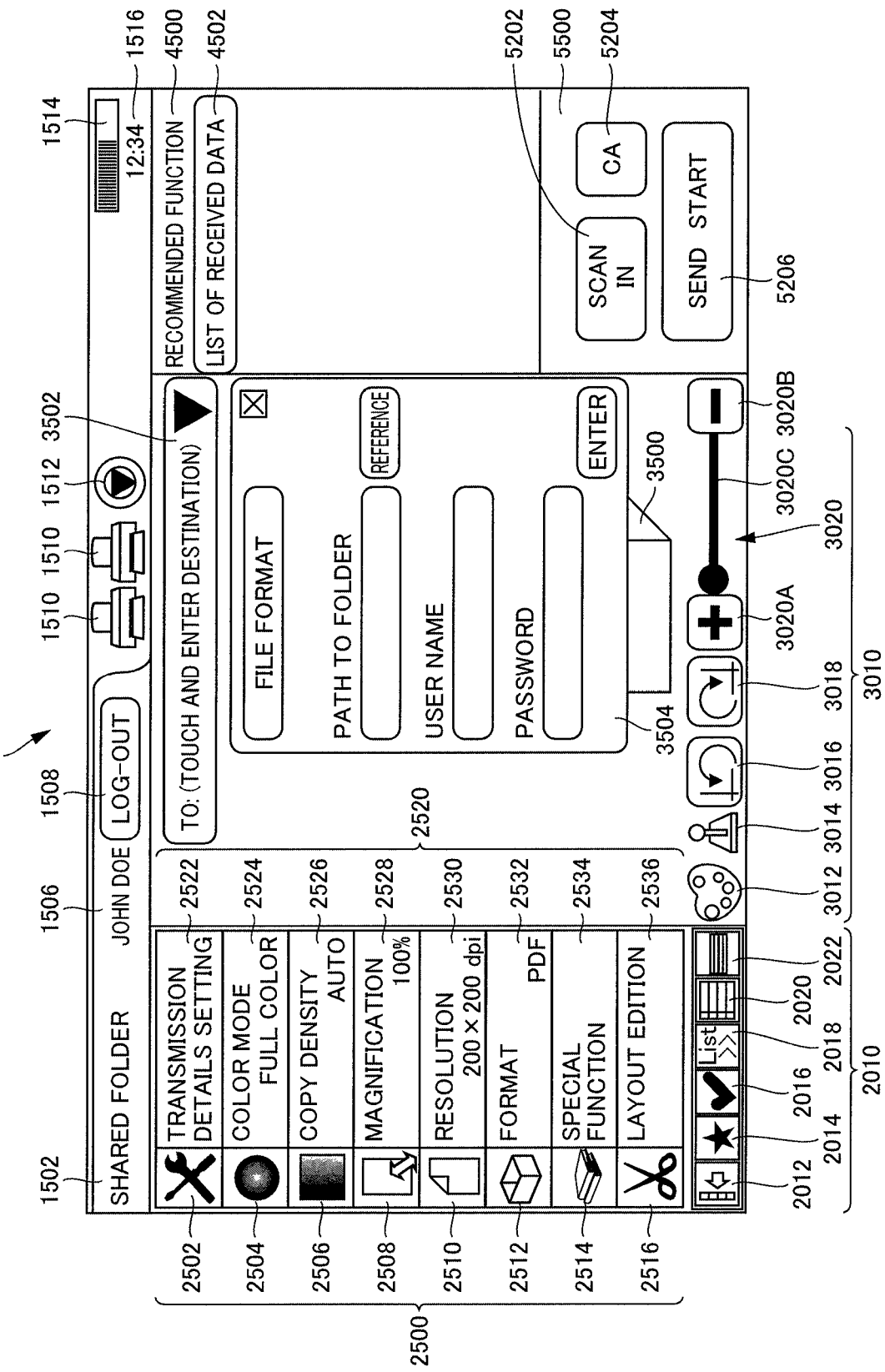
FIG. 11 shows a shared folder mode initial screen image displayed in the regular mode, displayed on the touch-panel display of the image forming apparatus in accordance with the embodiment of the present invention.

If icon 6254 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using shared folder initial screen image data read from HDD 302 or the like, the shared folder mode initial screen image is displayed on touch-panel display 130 (steps S10080 and S10090). Here, by way of example, shared folder mode initial screen image 7500 shown in FIG. 11 is displayed on touch-panel display 130. As shown in FIG. 11, shared folder mode initial screen image 7500 is divided into five areas of the layout described above, on which pieces of information are displayed. The configuration of shared folder mode initial screen image 7500 shown in FIG. 11 will be described later.

Data Input Mode

Figure 12:
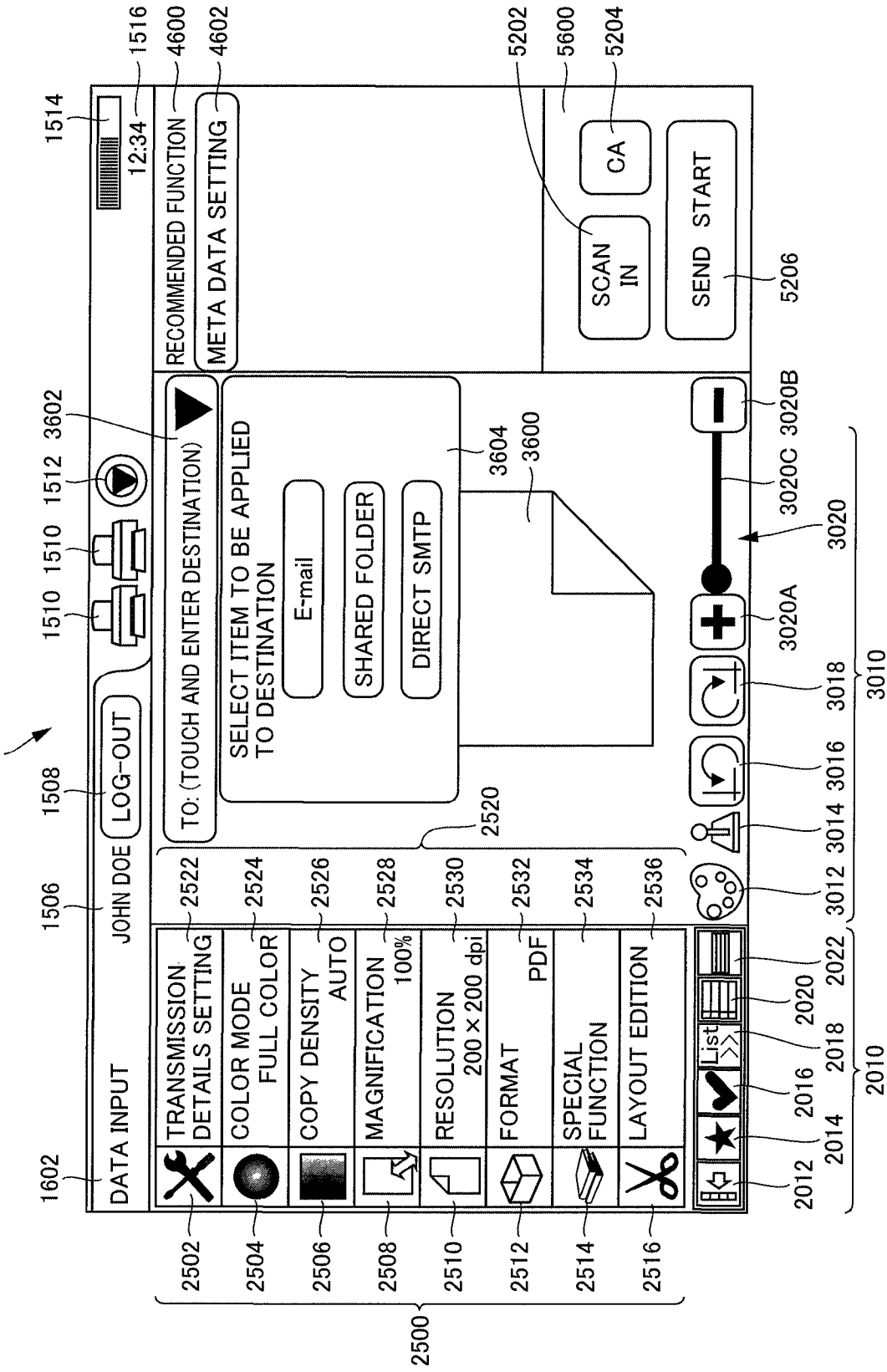
FIG. 12 shows a data input mode initial screen image displayed in the regular mode, displayed on the touch-panel display of the image forming apparatus in accordance with the embodiment of the present invention.

If icon 6252 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using data input initial screen image data read from HDD 302 or the like, the data input mode initial screen image is displayed on touch-panel display 130 (steps S10080 and S10090). Here, by way of example, data input mode initial screen image 7600 shown in FIG. 12 is displayed on touch-panel display 130. As shown in FIG. 12, data input mode initial screen image 7600 is divided into five areas of the layout described above, on which pieces of information are displayed. The configuration of data input mode initial screen image 7600 shown in FIG. 12 will be described later.

FTP Mode

Figure 13:
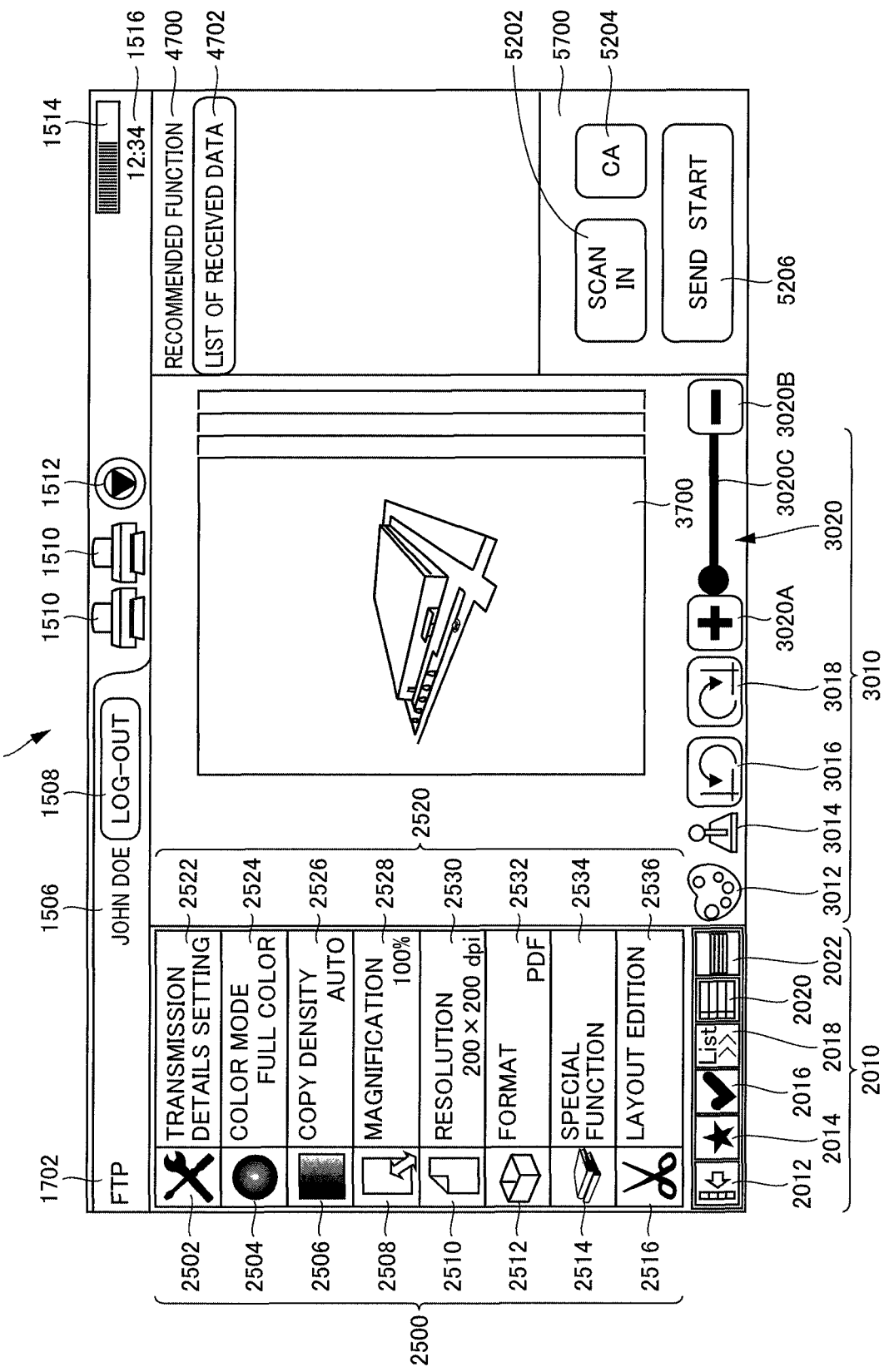
FIG. 13 shows an FTP mode initial screen image displayed in the regular mode, displayed on the touch-panel display of the image forming apparatus in accordance with the embodiment of the present invention.

If icon 6240 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using FTP initial screen image data read from HDD 302 or the like, the FTP mode initial screen image is displayed on touch-panel display 130 (steps S10080 and S10090). Here, by way of example, FTP mode initial screen image 7700 shown in FIG. 13 is displayed on touch-panel display 130. As shown in FIG. 13, FTP mode initial screen image 7700 is divided into five areas of the layout described above, on which pieces of information are displayed. The configuration of FTP mode initial screen image 7700 shown in FIG. 13 will be described later.

Desk Top Mode

Figure 14:
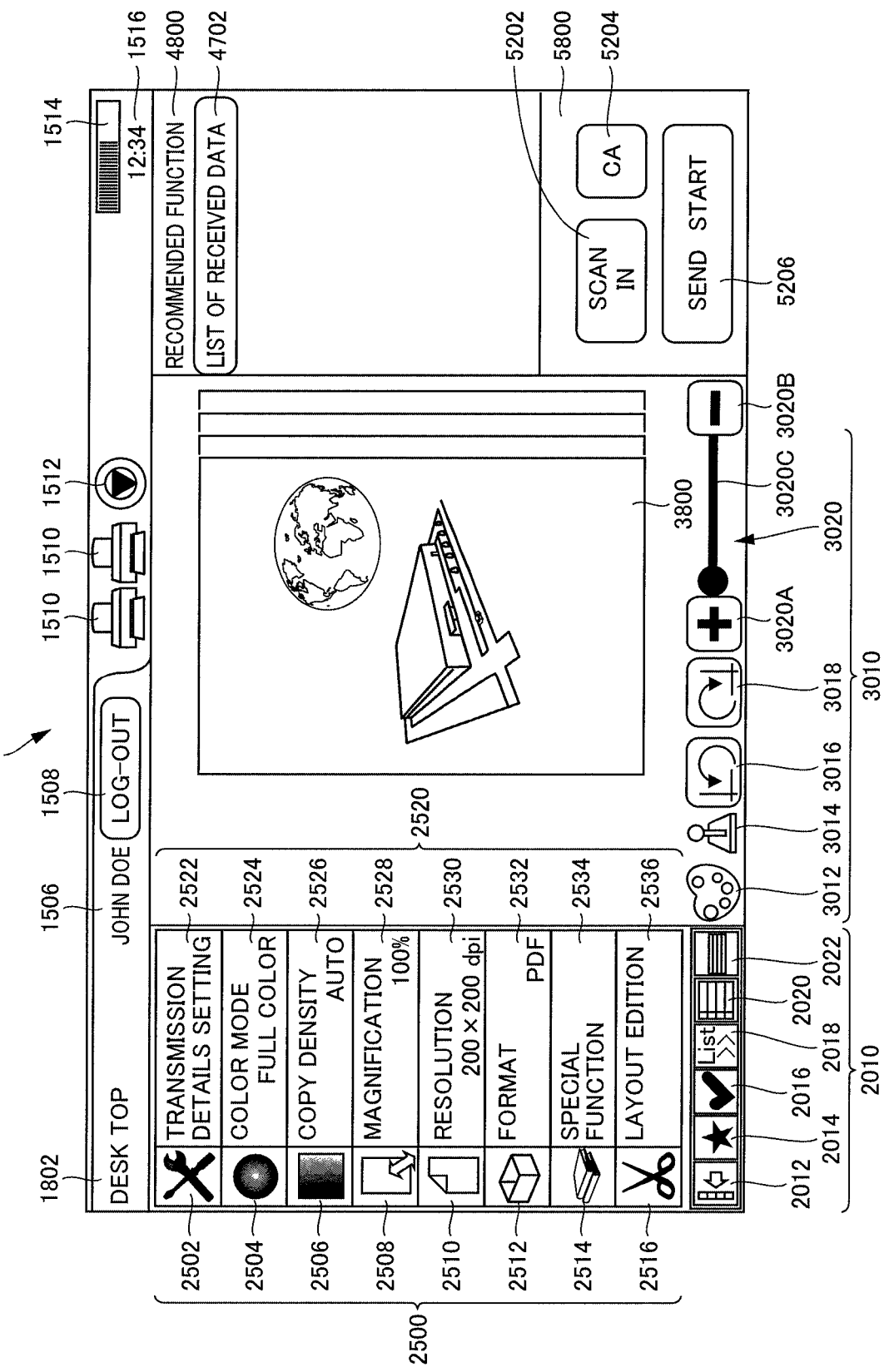
FIG. 14 shows a desk top mode initial screen image displayed in the regular mode, displayed on the touch-panel display of the image forming apparatus in accordance with the embodiment of the present invention.

If icon 6250 shown in FIG. 6 is touched, tapped or double tapped by the fingertip of a user, it is determined that the operational mode is selected (YES at step S10040), and that the selected operational mode is related to image transmission (YES at step S10050). Further, it is determined not to be an inclusive designation (NO at step S10060), and using desk top initial screen image data read from HDD 302 or the like, the desk top mode initial screen image is displayed on touch-panel display 130 (steps S10080 and S10090). Here, by way of example, desk top mode initial screen image 7800 shown in FIG. 14 is displayed on touch-panel display 130. As shown in FIG. 14, desk top mode initial screen image 7800 is divided into five areas of the layout described above, on which pieces of information are displayed. The configuration of desk top mode initial screen image 7800 shown in FIG. 14 will be described later.

Screen Image Configuration

The configurations of shared folder mode initial screen image 7500 shown in FIG. 11, data input mode initial screen image 7600 shown in FIG. 12, FTP mode initial screen image 7700 shown in FIG. 13 and desk top mode initial screen image 7800 shown in FIG. 14 will be described.

Referring to FIG. 11, on system area 1000 of shared folder mode initial screen image 7500, an area 1502 indicating the selected operational mode (here, shared folder mode), an area 1506 displaying the logged-in user name, an area 1508 displaying a log-out button (software button), an area 1510 displaying current job status, an area 1512 displaying a button (software button) related to the job status, an area 1514 displaying communication status and an area 1516 indicating the current time, are arranged.

In area 1506, the status of currently executed job is displayed by an icon. If the job status is touched, tapped or double-tapped, detailed information of job status is displayed. It is preferred to display a button or the like to stop a selected job, in area 1512.

In function selecting area 2000 of shared folder mode initial screen image 7500, a function selection menu allowing selection by the user in the shared folder mode and the group of change buttons 2010 described above are displayed. In the screen image shown in FIG. 11, the function selection menu is displayed in the regular mode.

As shown in FIG. 11, the function selection menu displayed in the regular mode includes a group of icons 2500 and a group of texts 2520. In the function selection menu displayed on function selecting area 2000, displayed are: an icon 2502 for setting the details of transmission conditions in the shared folder mode and a text 2522 showing the set contents; an icon 2504 for setting the color mode in the shared folder mode and a text 2524 showing the set contents; an icon 2506 for setting density in the shared folder mode and a text 2526 showing the set contents; an icon 2508 for setting magnification in the shared folder mode and a text 2528 showing the set contents; an icon 2510 for setting resolution in the shared folder mode and a text 2530 showing the set contents; an icon 2512 for setting a format in the shared folder mode and a text 2532 showing the set contents; an icon 2514 for setting a special function in the shared folder mode and a text 2534 showing the set contents; and an icon 2516 for editing layout in the shared folder mode and a text 2536 showing the set contents.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

In preview area 3000 of shared folder mode initial screen image 7500, a button 3502 is displayed for inputting a transmission destination in the shared folder mode. When button 3502 is touched, tapped or double-tapped, an area 3504 is displayed. The user operates the area 3504 to designate information (folder name, user name and password) of the transmission destination.

In action panel area 4000 of shared folder mode initial screen image 7500, pieces of information related to assistance, guidance and suggestion related to the shared folder operation are displayed. As shown in FIG. 11, recommended functions in the shared folder mode selected by the user are displayed. In action panel area 4000, an area 4500 showing the contents of displayed information, and an area 4502 showing, as text, the recommended function and serving as software button, are arranged. When area 4502 is touched, tapped or double-tapped, detailed information on the data that is being received is pulled-down and displayed.

In task trigger area 5000 of shared folder mode initial screen image 7500, a group of execution buttons 5500 are displayed. The group of execution buttons 5500 includes: a scan-in key (software button) 5202 for operating image forming apparatus 100 to scan a document and obtain image data; a clear-all key (software button) 5204, for clearing set function or functions; and a transmission start key (software button) 5206 for operating image forming apparatus 100 to scan a document and perform the process for shared-folder transmission.

If a user inputs a request (YES at step S10100) on shared folder mode initial screen image 7500 displaying pieces of information in five divided areas as described above, a shared folder process is executed in accordance with the request (step S10110).

In the following, differences from FIG. 11 will be described.

Referring to FIG. 12, on system area 1000 of data input mode initial screen image 7600, an area 1602 indicating the selected operational mode (here, data input mode) is displayed. On preview area 3000 of data input mode initial screen image 7600, an area 3604 for designating items to be applied to the destination is displayed. The user operates the area 3604 to designate items (E-mail, shared folder and direst SMTP) to be applied to transmission. On action panel area 4000 of data input mode initial screen image 7600, pieces of information related to assistance, guidance and suggestion related to the data input operation are displayed. As shown in FIG. 12, recommended functions in the data input mode selected by the user are displayed. In action panel area 4000, an area 4600 showing the contents of displayed information, and an area 4602 showing, as text, the recommended function and serving as software button, are arranged. When area 4602 is touched, tapped or double-tapped, detailed information related to setting of meta data is pulled-down and displayed.

If a user inputs a request (YES at step S10100) on data input mode initial screen image 7600 displaying pieces of information in five divided areas as described above, a data input process is executed in accordance with the request (step S10110).

Referring to FIG. 13, on system area 1000 of FTP mode initial screen image 7700, an area 1702 indicating the selected operational mode (here, FTP mode) is displayed. On action panel area 4000 of FTP mode initial screen image 7700, pieces of information related to assistance, guidance and suggestion related to the FTP operation are displayed. As shown in FIG. 13, recommended functions in the FTP mode selected by the user are displayed. In action panel area 4000, an area 4700 showing the contents of displayed information, and an area 4702 showing, as text, the recommended function and serving as software button, are arranged. When area 4702 is touched, tapped or double-tapped, detailed information related to the data that is being received is pulled-down and displayed.

If a user inputs a request (YES at step S10100) on FTP mode initial screen image 7700 displaying pieces of information in five divided areas as described above, an FTP process is executed in accordance with the request (step S10110).

Referring to FIG. 14, on system area 1000 of desk top mode initial screen image 7800, an area 1802 indicating the selected operational mode (here, desk top mode) is displayed.

If a user inputs a request (YES at step S10100) on desk top mode initial screen image 7800 displaying pieces of information in five divided areas as described above, a desk top process is executed in accordance with the request (step S10110).

—Change of Operational Mode in FAX Mode—

In the following, description will be given assuming that the operational mode is FAX mode. The operation is the same in other operational modes related to image transmission. Specifically, when the user touches an area indicating the present operational mode, a screen image for changing the operational mode is popped up, allowing transition to another operational mode related to image transmission.

Figure 15:
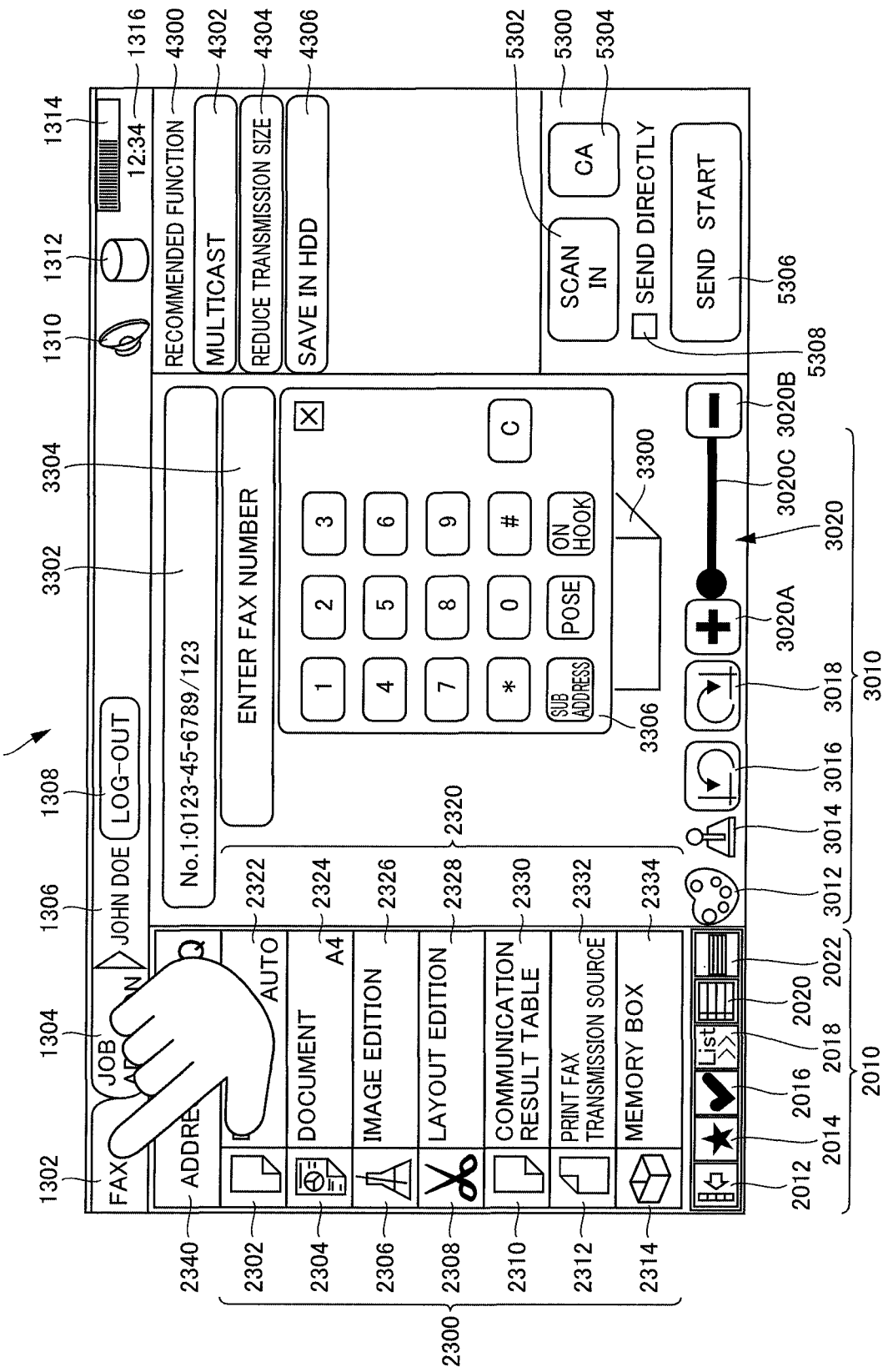
FIG. 15 shows a manner how the user touches the operational mode display area in the FAX initial screen image shown in FIG. 9.

Referring to FIG. 15, while the FAX mode initial screen image is displayed on touch-panel display 130, when area 1302 indicating that the FAX mode is selected is touched, tapped or double-tapped by the user, a request for changing the operational mode related to image transmission is detected (YES at step S10130). The request for changing the operational mode is similarly detected when any of area 1202 of FIG. 8, area 1402 of FIG. 10, area 1502 of FIG. 11, area 1602 of FIG. 12, area 1720 of FIG. 13 and area 1802 of FIG. 14 is touched, tapped or double-tapped by the user (YES at step S10130). It is also possible to determine that a request for changing the operational mode is detected when an area other than the above is touched, tapped or double-tapped by the user.

As shown in FIG. 16, screen image 7360 for changing operational mode is displayed, popped-up on touch-panel display 130 (step S10140). As can be seen from FIG. 16, on screen image 7360 for changing operational mode, operational modes related to image transmission provided in image forming apparatus 100 are displayed as software buttons. Here, the currently selected operational mode may or may not be included in the display. Further, on screen image 7360 for changing operational mode, an icon (×) for closing the pop-up screen image is also displayed.

If one of the operational modes related to image transmission displayed on screen image 7360 for changing operational mode is touched, tapped or double-tapped by the user, it is determined that an operational mode is selected (YES at step S10150), initial screen image data of the selected operational mode is read from HDD 302 or the like (step S10080), and the initial screen image of the selected operational mode is displayed on touch-panel display 130 (step S10090).

As described above, the image forming apparatus in accordance with the present embodiment is characterized in the following points: (1) in the home screen image for selecting an operational mode, a direct icon allowing direct transition to a screen image of the operational mode requested by the user, and an inclusive icon causing transition to a screen image of an operational mode (for example, FAX mode) set in advance as a mode related to image transmission displayed with priority or inclusively among a plurality of paths for image transmission are provided; (2) while an icon allowing transition to the copy mode screen image is displayed at the center, icons allowing transition to screen images of operational modes related to image transmission are provided in the surrounding area, and the inclusive icon among the icons related to image transmission is arranged on the lower side closest to the user; and (3) in the condition setting screen image displayed when a mode related to image transmission is selected, a software button or buttons are provided, allowing transition to other modes related to image transmission (after transition to the operational mode with priority using the inclusive icon, transition is made to another operational mode).

As a result, the following effects can be attained. (A) An operation setting path in which transition to the FAX mode as a mode related to image transmission is made through an inclusive icon (icon with priority) and thereafter a mail mode as another mode related to image transmission is selected, similar to a hardware button in the conventional image forming apparatus, and an operation setting path in which an operational mode is directly selected without providing any hardware button as in the image forming apparatus of the present embodiment, are prepared. Therefore, both conventional users and new users can select without confusion the operational mode of image forming apparatus in accordance with the present embodiment. (B) Since the copy mode and the mode related to image transmission are displayed broadly divided from each other, selection of an operational mode does not cause any confusion. (C) The inclusive icon allowing selection of an operational mode related to image transmission with the same feeling as in the conventional image forming apparatus is arranged close to the user side. Therefore, when a user of a conventional apparatus operates the inclusive icon with the same feeling as for the conventional apparatus, the direct icons are not hidden by the user's hand but visible. As a result, the user can recognize the new option of operation (direct selection of an operational mode). When the user notices and tries the new option, he/she will be accustomed to the new manner of operation.

<Modification>

In the embodiment above, it is described that transition can be made from an operational mode related to image transmission to another operational mode related to image transmission directly (not through the home screen image). A configuration allowing transition from an operational mode related to image transmission to another operational mode not related to image transmission directly (not through the home screen image), a configuration allowing transition from an operational mode not related to image transmission to another operational mode related to image transmission directly (not through the home screen image), a configuration allowing transition from an operational mode not related to image transmission to another operational mode not related to image transmission directly (not through the home screen image), and a configuration allowing transition from an operational mode that is being selected to another operational mode, regardless of the type of operational modes, directly and not through the home screen image, may also be possible.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus as an object of control operating in a mode selected by a user from a plurality of modes, comprising:
    a display device displaying a plurality of information items corresponding to said plurality of modes, aligned with their sizes changed considering either priority of the modes or difference in output from the apparatus as the object of control;
    a detector arranged superposed on said display device, for detecting a mode selected by the user based on an information item displayed at a position touched by a fingertip of the user; and
    a display controller controlling said display device;
    said modes include two or more communication modes; and
    said display controller includes a circuit displaying an inclusive information item allowing selection of one of the communication modes given priority among the two or more communication modes and allowing selection of another communication mode through said communication mode given priority, and a plurality of information items allowing selection of any of said two or more communication modes.

2. The operation console according to claim 1, wherein said display controller further includes a circuit for switching a screen image when a communication mode with priority is selected, to display a condition setting screen image in the selected communication mode, and
    a circuit for displaying an information item allowing transition to another communication mode on said condition setting screen image.

3. The operation console according to claim 1, wherein
    said modes include a non-communication mode and two or more communication modes; and
    said display controller includes
    a circuit for displaying a first information item allowing selection of the non-communication mode and a plurality of second information items allowing selection of a communication mode, and
    a circuit for displaying said second information items aligned around said first information item.

4. The operation console according to claim 3, wherein said display controller includes a circuit for displaying a third information item allowing selection of one communication mode with priority among the two or more communication modes, and a plurality of fourth information items allowing selection of any of said two or more communication modes, as said second information items.

5. The operation console according to claim 4, wherein said display controller includes a circuit displaying said third information item at a position closer to the user than said fourth information item.

6. The operation console according to claim 4, wherein said display controller includes a circuit for displaying said third and fourth information items such that said fourth information item is not hidden by the user's hand touching said third information item.

7. The operation console according to claim 1, wherein said display device and said detector are implemented by a touch-panel display.

8. An electronic device provided with the operation console according to claim 1.

9. An image processing apparatus provided with the operation console according to claim 1.

10. The image processing apparatus according to claim 9, wherein difference in output from the image processing apparatus as said apparatus as the object of control is difference between print output on a sheet of recording paper and transmission output of data.

11. The image processing apparatus according to claim 9, wherein
    said communication mode is an image communication mode; and
    when two or more communication modes are provided, said communication modes have different communication paths.

12. The image processing apparatus according to claim 9, wherein
    said communication mode is an image communication mode; and
    when a communication mode with priority is provided among two or more communication modes, the communication mode with priority is a mode set by the user.

13. The image processing apparatus according to claim 9, wherein
said communication mode is an image communication mode; and
when a non-communication mode is included in said modes, said non-communication mode is an image forming mode.

14. A method of displaying information on an operation console provided on an apparatus as an object of control operating in a mode selected by a user from a plurality of modes, comprising:
the display step of displaying, on a display panel, a plurality of information items corresponding to said plurality of modes, aligned with their sizes changed considering either priority of the modes or difference in output from the apparatus as the object of control; and
the detecting step of detecting, using a touch-panel arranged superposed on said display panel, a mode selected by the user based on an information item displayed at a position touched by a fingertip of the user;
said modes include two or more communication modes; and
said display step includes a step of displaying an inclusive information item allowing selection of one of the communication modes given priority among the two or more communication modes and allowing selection of another communication mode through said communication mode given priority, and a plurality of information items allowing selection of any of said two or more communication modes, on said display panel.

15. An operation console provided on an apparatus as an object of control operating in a mode selected by a user from a plurality of modes, comprising:
a display device displaying, before selection of any mode, a plurality of information items corresponding to said plurality of modes, aligned with their sizes changed considering either priority of the modes or difference in output from the apparatus as the object of control;
a detector arranged superposed on said display device, for detecting a mode selected by the user based on an information item displayed at a position touched by a fingertip of the user; and
a display controller controlling said display device;
said modes include two or more communication modes; and
said display controller includes a circuit displaying an inclusive information item allowing selection of one of the communication modes given priority among the two or more communication modes and allowing selection of another communication mode through said communication mode given priority, and a plurality of information items allowing selection of any of said two or more communication modes.

16. An operation console provided on an apparatus as an object of control operating in a mode selected by a user from a plurality of modes, comprising:
a display device displaying a plurality of information items corresponding to said plurality of modes, aligned considering either priority of the modes or difference in output from the apparatus as the object of control;
a detector arranged superposed on said display device, for detecting a mode selected by the user based on an information item displayed at a position touched by a fingertip of the user; and
a display controller controlling said display device; wherein
said modes include two or more communication modes; and
said display controller includes a circuit displaying an inclusive information item allowing selection of one of the communication modes given priority among the two or more communication modes and allowing selection of another communication mode through said communication mode given priority, and a plurality of information items allowing selection of any of said two or more communication modes,
a circuit for switching a screen image when a communication mode with priority is selected, to display a condition setting screen image in the selected communication mode, and
a circuit for displaying an information item allowing transition to said another communication mode on said condition setting screen image.

* * * * *